(12) United States Patent
Tupper et al.

(10) Patent No.: US 6,175,178 B1
(45) Date of Patent: Jan. 16, 2001

(54) LOW INDUCTANCE ELECTRICAL MACHINE FOR FLYWHEEL ENERGY STORAGE

(76) Inventors: Christopher N. Tupper; Duncan G. Wood, both of 14 Industrial Pkwy., Brunswick, ME (US) 04011

( * ) Notice: Under 35 U.S.C. 154(b), the term of this patent shall be extended for 0 days.

(21) Appl. No.: 09/443,873

(22) Filed: Nov. 19, 1999

Related U.S. Application Data

(63) Continuation-in-part of application No. 09/422,476, filed on Oct. 21, 1999.

(51) Int. Cl.[7] .................. H02K 16/00; H02K 21/12; H02K 1/00; H02K 1/10; H02K 3/04
(52) U.S. Cl. .................. 310/166; 310/156; 310/114; 310/185; 310/186; 310/210; 310/254; 310/268
(58) Field of Search ................. 310/156, 179, 310/180, 181, 182, 183, 184, 185, 197, 210, 166, 254, 261, 268, 153, 186, 74, 114, 152, 164

(56) References Cited

U.S. PATENT DOCUMENTS

| | | | |
|---|---|---|---|
| 2,823,545 | * 3/1958 | Bodge | 310/164 |
| 2,997,611 | 8/1961 | Feiner et al. | 310/164 |
| 3,858,071 | 12/1974 | Griffing et al. | 310/266 |
| 3,916,284 | 10/1975 | Hilgendorf | 363/10 |
| 4,087,711 | 5/1978 | Kirtley et al. | 310/184 |
| 4,488,075 | * 12/1984 | DeCesare | 310/156 |
| 4,547,713 | 10/1985 | Langley et al. | 318/254 |
| 4,563,606 | 1/1986 | Fukasawa et al. | 310/208 |
| 5,124,605 | 6/1992 | Bitterly et al. | 310/74 |
| 5,304,883 | 4/1994 | Denk | 310/180 |
| 5,440,185 | * 8/1995 | Allwine, Jr. | 310/156 |
| 5,565,836 | 10/1996 | Groehl et al. | 336/225 |
| 5,606,210 | * 2/1997 | Lin | 310/153 |
| 5,798,594 | 8/1998 | Radovsky et al. | 310/180 |
| 6,051,959 | 4/2000 | Tupper | 322/78 |

* cited by examiner

Primary Examiner—Nestor Ramirez
Assistant Examiner—Guillermo Perez
(74) Attorney, Agent, or Firm—Pierce Atwood; Chris A. Caseiro

(57) ABSTRACT

A low inductance electrical machine which may be used as an alternator or motor with low armature inductance is disclosed. Arrangements of complementary armature windings are presented in which the fluxes induced by currents in the armature windings effectively cancel leading to low magnetic energy storage within the machine. This leads to low net flux levels, low core losses, low inductance and reduced tendency toward magnetic saturation. Separately excited field arrangements are disclosed that allow rotor motion to effect brushless alternator or brushless motor operation. An exemplary geometry includes a stator including two toroidal rings and a concentric field coil together with a rotor structure separated from the stator by four air gaps. An alternate embodiment allows for counter-rotation of two rotor elements for use as a flywheel energy storage system in which the external gyroscopic effects cancel.

23 Claims, 18 Drawing Sheets

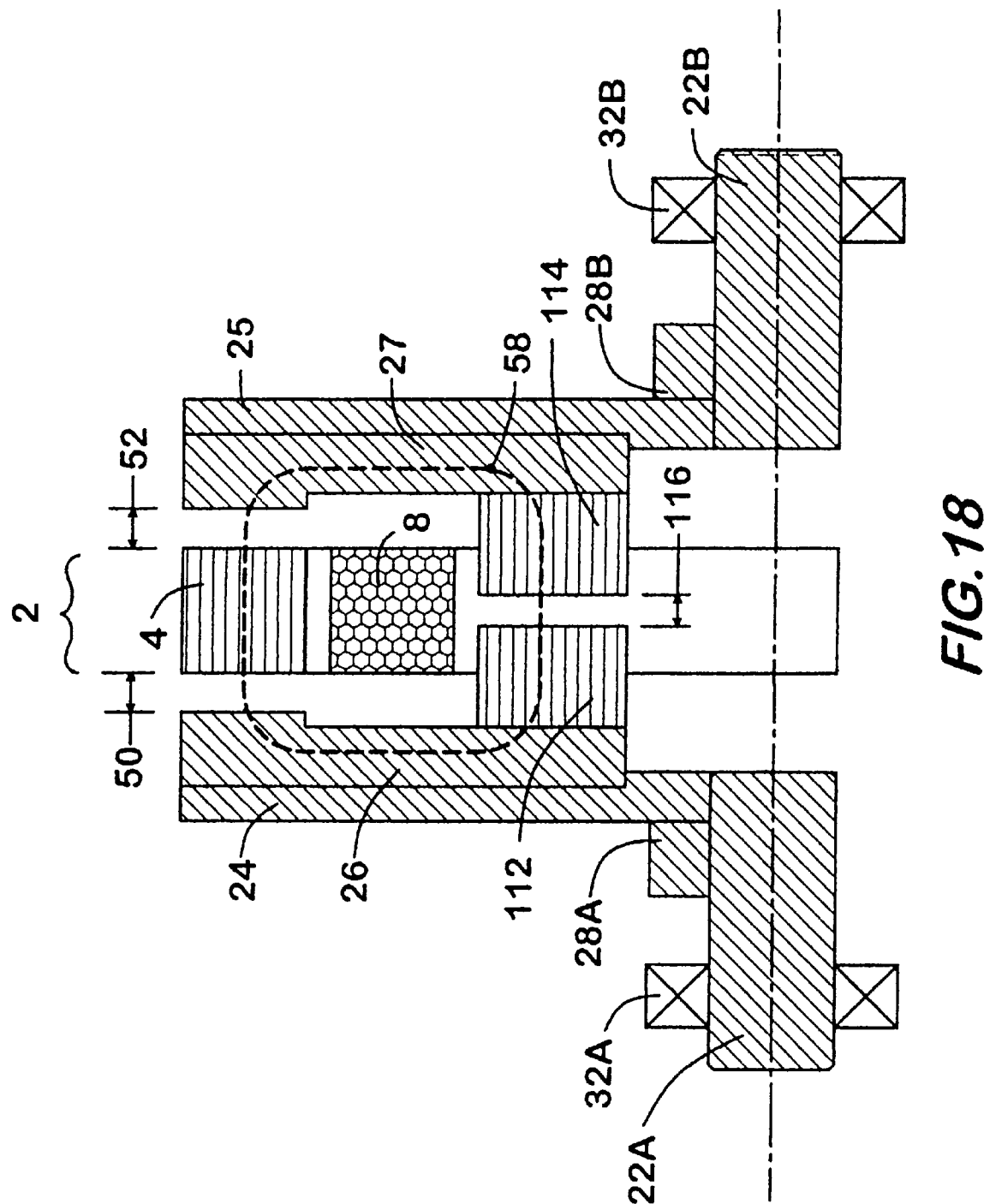

LOW INDUCTANCE ELECTRICAL MACHINE FOR FLYWHEEL ENERGY STORAGE

CROSS REFERENCE TO RELATED PATENT APPLICATION

This patent application is a continuation-in-part (CIP) of the co-pending Christopher N. Tupper et al. U.S. patent application Ser. No. 09/422,476 filed Oct. 21, 1999, for LOW INDUCTANCE ELECTRICAL MACHINE. The content of the related patent application is incorporated herein by reference.

BACKGROUND OF THE INVENTION

1. Field of Invention

This invention relates generally to the design of electrical machines, and more particularly to the design of alternators, generators and motors having low inductance in the armature circuits with particular emphasis on use in flywheel energy storage systems

2. Description of the Prior Art

As is well understood by those skilled in the art, electrical machines have an internal impedance that interacts with other system impedance to determine the performance of the combined system. In a motor, the inductance is that portion of the internal impedance related to magnetic energy storage within the electrical machine as it is energized to deliver mechanical work. The electrical system driving the motor must deliver the energy to be stored in the inductor in addition to the energy for the mechanical work to be performed. This necessitates increases in the capacity of generators, wiring and transformers needed to supply the motor.

In alternators and generators the internal impedance is, perhaps, even more important. The alternator or generator impedance combines with the load impedance to determine the performance of the whole system. As the internal impedance of an alternator or generator is made to be a smaller fraction of the total impedance, the output voltage of the alternator or generator becomes a larger fraction of the ideal (pre-loss) voltage provided by the idealized source. In the current art care is generally taken to provide low resistance pathways in the copper windings of an alternator or a generator in order to minimize internal resistance and to minimize the power lost in the alternator or the generator and the waste heat that needs to be dissipated.

Another factor in the impedance of the alternator or generator is the inductance of the output windings. This inductance is a direct result of winding the output coils around magnetic pathways in the alternator or generator, this being the technique usually used to generate the output voltage. Any output current in such windings will store magnetic energy in the same magnetic pathways, as is well understood. The inductance, "L" of the circuit is related to this stored energy by the equation $$L = 2 * (\text{Energy Stored})/(\text{Current}^2)$$

The inductance of the output windings is part of the internal impedance and acts to filter the output voltage applied to the load. As frequencies get higher this inductive impedance blocks an increasing proportion of the ideal voltage provided by the alternator or generator and prevents it from acting on the load. While this has not been much of an issue for 60 Hz synchronous generators, it becomes a substantial design challenge for high frequency alternators. This has been known for some time; for example Griffing and Glockler present the design of a "High Frequency Low Inductance Generator" in U.S. Pat. No. 3,858,071.

High frequency alternators or generators are desirable in that high levels of output power can be achieved with physically small magnetic paths; resulting in physically compact units. Claw pole alternators are typical of the physical design of high frequency generator devices and achieve high frequency by having a plurality of alternating poles. A disadvantage of these physically small claw pole units is that the close proximity of multiple poles and multiple magnetic pathways allows for unnecessary storage of substantial amounts of magnetic energy, resulting in high output inductance.

High output inductance causes several difficulties in the operation of high frequency alternators or generators. The impedance, Z of the inductor grows directly with the operating frequency (co, rad/sec) as shown in the following formula:

$$Z(\omega) = j * \omega * L \, (j = \text{imaginary operator})$$

The higher the frequency, the greater the impedance and filtering. To overcome this filtering, the ideal voltage must be increased as the frequency is increased. The ideal (pre-loss) voltage is usually increased by increasing the magnetic excitation level of the field, leading to higher magnetic intensity levels in the magnetic pathways. Since core losses due to eddy current generation are proportionate to both the frequency squared and the magnetic intensity level squared it will be understood that the need for extra excitation to overcome the inductive impedance of the output will lead to high core losses at high frequency operation. At the limit, when the excitation levels reach the point where magnetic pathways become saturated, further excitation is precluded, and the output of the device drops off with further increases in operating frequency.

As a counterpoint to this, if internal inductance were negligible, then the output voltage would rise with increasing frequency due to the increased change of flux with time. The excitation levels could then be reduced as the frequency increased, leading the device away from saturation. The decrease in excitation would offset the increase in frequency such that the core losses would remain nearly constant with operating frequency.

It is therefore an objective of this invention to provide an electrical machine which may be used as a high frequency alternator with low output inductance.

Furthermore, high frequency alternators are often poly-phased devices used with solid state circuits to rectify, switch, commutate or chop the output and reform it into DC or desired power frequency (50 or 60 Hz, etc) AC forms. In such devices individual alternator output phases are turned on and off at high frequencies, again invoking the filtering of the output inductance. Also, it is common for the output inductance of one phase to be linked by mutual inductance to the output of other phases so that the sudden change in current (switching) in one phase produces unwanted voltage transients in the other phases.

It is therefore a further objective of this invention to provide an electrical machine which may be used as a poly-phase high frequency alternator with minimal adverse effects caused by mutual inductance between phases.

As noted for the typical high frequency alternators, such as the claw pole type, the close proximity of multiple poles and magnetic paths gives rise to the unnecessary storage of large amounts of magnetic energy. This is important in the field excitation circuit as well as the output circuit because of the saturation and core-loss issues already mentioned. It should be noted that the majority of magnetic energy is stored in the high reluctance air spaces which are interconnected by the low reluctance ferro-magnetic pathways in which the saturation and core-losses phenomenon occur. So called "leakage flux" passes through the air spaces to complete magnetic circuits without going through the intended pathways which link output coils. In physically compact machines where many poles and pathways are arranged in close proximity the leakage flux can become a high percentage of flux, making the machine inefficient.

Alternators and generators based on armatures with poloidal windings around a stator shaped as an annular ring (or toroid) have long been know. Kirkley and Smith present a design based on radial air gaps in U.S. Pat. No. 4,087,711. Further improvements were presented by Radovsky in U.S. Pat. No. 5,798,594 in which a brushless synchronous machine is presented with axial air gaps completing the magnetic circuit through an annular ring stator in a fashion that greatly limits the leakage flux from the field. The rotors in these designs are relatively complex, present difficulties in establishment of air gap clearances, and do not address the issues of output inductance or mutual inductance between phases.

It is therefore a further objective of this invention to provide a low inductance electric machine which may be used as a brushless alternator with low leakage of the field flux combined with simplified rotor construction and provision for independently establishing multiple air gaps.

Recent work by Groehl, disclosed in U.S. Pat. No. 5,565,836, presents methods for achieving the nullification of unnecessary components of flux within a toroidally wound inductor by use of concentric windings around the arcuate axis of the toroid combined with electrical connection of such windings so that currents of equal magnitude and opposite direction provide flux cancellation. While the cancellation of internal flux fields within the toroid can be used to create low inductance, and is fundamental to the design and operation of the common electrical power transformer, the heretofore known configurations have not been suitable for the efficient transformation between mechanical and electrical energy.

It is therefore a further objective of this invention to provide an electrical machine wherein the benefits of flux cancellation within a toroid, or other closed shape, can be combined with arrangements for the efficient transformation between mechanical and electrical energy.

The previously mentioned high frequency alternators may be used for the production of (low) power frequency (60 Hz) AC power through methods disclosed by Hilgendorf in U.S. Pat. No. 3,916,284 and improvements presented by Tupper in US patent application Ser. No. 09/002,121, "Apparatus for Resonant Excitation of High Frequency Alternator Field". In this use the field excitation of the high frequency alternator is subjected to 60 Hz amplitude modulation. This leads to 60 Hz fluctuations of the magnetic field throughout the alternator's magnetic core, with attendant possibilities for eddy current core losses. Many traditional alternators are designed for essentially constant levels of magnetic excitation. These traditional alternators typically use core structures, such as solid iron rotors, that are not optimized to reduce eddy current losses. For constant levels of excitation this is acceptable as there is little change in field excitation and therefore little core loss. These traditional alternators are not suited to use with 60 Hz amplitude modulation of the field; the core losses due to field modulation would be too large.

It is therefore a further objective of this invention to provide an electrical machine wherein the field excitation may be amplitude modulated at power frequencies while core losses are minimized.

As is well known, many electromechanical devices can be run in either a motor or generator mode. A generator with low internal inductance might also be operated as a motor with low internal inductance. In motor operation, low internal inductance reduces the requirements for the electric supply system to handle energy which is stored in the magnetic field of the device. Furthermore high armature inductance can impede the rapid change of armature pole currents and magnetic fields, thereby restricting the high frequency response of the motor. A motor with low armature inductance would allow relatively high frequency operation of the motor, which is useful in variable speed applications.

It is therefore a further objective of this invention to provide an electric machine which may be used as a motor with low inductance of the armature circuits.

In stepper motor operations precise control of the shaft position is achieved through the creation of a discrete step relationship between rotor pole position and armature excitation. This is useful for many industrial applications requiring careful control of shaft position. It is therefore a further objective of this invention to provide for an electrical machine with low armature inductance and which may be operated like a stepper motor.

In contrast to the stepper motor operations, during synchronous motor operations it is desirable to achieve a smooth rotation of the shaft. It is an additional objective of this invention to provide a low inductance electric machine that may be used as a synchronous motor with smooth rotation of the shaft.

Where motors are used in systems with requirements for regenerative braking it is desirable to be able to control the regenerated voltage and current independently from shaft RPM. For example, an electrically powered automobile using regenerative braking to stop at a traffic light would need to control the generated power so that it was constantly suitable for recharging the vehicle battery even as the vehicle slows to a stop.

It is a further object of this invention to provide an electromechanical device that can be operated as a motor and which can be switched to operation as a generator with controllable output voltage to extract electrical energy from the momentum of the driven system.

Rapidly rotating flywheels may be used to store substantial amounts of mechanical energy. Electrical machines which can efficiently act as motors and generators at the flywheel rotor speeds of 20,000–100,000 RPM are an essential part of flywheel energy storage systems. In the present state of the art permanent magnet motor/generators are built wherein the rotors act both as electromechanical conversion devices and as flywheels for the mechanical storage of energy. The device is operated as a motor with no external load in order to speed up the flywheel to store more energy. The device is operated as a generator, slowing the flywheel rotor's spin rate as energy is withdrawn. Such devices are proposed for storing and delivering "peaking" power in systems that use solar panels or small internal combustion engines to provide the average power over time but where these average power sources are not designed to handle peak power loads. Permanent magnet devices have output voltages that vary with the shaft speed so cumbersome power conditioning equipment is needed to maintain a steady output voltage. Since the flywheel RPM varies with the amount of energy stored it is desirable to have a device with controllable voltage output regardless of flywheel shaft speed.

It is a further object of this invention to provide an electro-mechanical device that can be operated as a motor to store flywheel energy in its rotor, and which can be operated as a generator with controllable output voltage to extract electrical energy from the flywheel energy of its rotor.

Flywheels have large gyroscopic effects which can be problematical for use in terrestrial and space vehicles. One solution is to have two flywheel energy storage devices rotating in opposite directions so that the gyroscopic effects can be made to cancel. This generally means at least two separate devices connected so that mechanical reaction forces can cancel each other, and a control system to keep the rotor speeds in a desired relationship (usually equal). U.S. Pat. No. 5,124,605 by Bitterly, et al. presents a flywheel energy storage device with counter-rotating flywheels integral to a single device.

It is an additional object of this device to provide a low inductance electro-mechanical device for use as a flywheel energy storage device wherein the gyroscopic effects are nullified within a single device.

SUMMARY OF THE INVENTION

The objects set forth above as well as further and other objects and advantages of the present invention are achieved by embodiments of the invention described below. The present invention includes a shaft which may be made of non-magnetic material. A stator includes an inner and an outer part, each shaped as concentric annular rings (or toroids) centered around but separate from the shaft, each of approximately the same axial dimension, and made entirely of laminated electrical or magnetic steel or other suitable magnetic material with low core loss characteristics in order to minimize eddy current losses and hysteresis losses in the stator. A field coil of insulated copper or other suitable material wound as an annular ring is located between and concentric with the two stator pieces and is also independent of the shaft. Securely attached to the shaft are two rotor disk assemblies which may be generally made of non-magnetic and low-conductivity materials, each holding the same even number of rotor pole bars. The bars are evenly spaced in a circumferential direction and extend a distance parallel to that from the inner diameter of the inner stator part to the outer diameter of the outer stator part. These rotor pole bars are made entirely of laminated electrical or magnetic steel or other suitable magnetic material with low core loss characteristics in order to minimize eddy current losses and hysteresis losses in the rotor pole bars. The rotor discs are independently located along the axis of the shaft such that the rotor pole bars rotate past the axial ends of the inner and outer concentric stator rings with axial air gaps of the desired magnitude. The two rotor discs are angularly offset from each other by a distance of one pole spacing, which distance is the same as one half of the circumferential pitch of the rotor pole bars on one disc, so that the rotor pole bar and air gap adjacent to the outer stator ring alternates from one disc to the other as one progresses around the circumference of the outer stator ring. The rotor pole bars can be magnetized to create rotor poles of excitation flux induced by current in the field coil. Armature coils are provided for one or more phases. Armature poles of each phase are wound in complementary pairs poloidially around the outer stator ring, each member of the complementary pair being wound in opposite direction around the ring and connected in series such that the magnetic fields induced by a current in the winding would be of opposite sense in each winding and thus cancel. There should be one pair of complementary windings for each phase for each pair of rotor pole bars and these windings should be evenly spaced along the circumference of the outer stator ring with adjacent windings of the same phase being of opposite directional sense. Winding for other phases should be arranged similarly, but angularly displaced around the circumference by an appropriate fraction of the pole spacing to effect the desired electrical phase relationships.

In alternator or generator operation mode the field coil is energized and the shaft and rotor are turned by external means such that the rotor pole bars concentrate the field excitation flux in a moving pattern of air gaps along the circumference of the stator rings. The changing flux in the outer stator ring causes voltage to be induced in the armature coils.

In motor operation mode the armature windings are energized in controlled sequence and attract the rotor pole bars to preferred positions. The rotor pole bars themselves can be further magnetized by the current in the field coil in order to control the level of attraction between the armature windings and the rotor pole bars, and thus control the shaft and pullout torque.

In another embodiment of the device the single rotor shaft with the two rotor disks is replaced with two, independent, co-linear rotor shafts each with one rotor disk, held, by bearings, in the same position as before, but allowed to rotate in opposite directions so that the gyroscopic effects of each rotor will tend to oppose the gyroscopic effects of the other.

For a better understanding of the present invention, together with other and further objects thereof, reference is made to the accompanying drawings and detailed description and its scope will be pointed out in the appended claims.

BRIEF DESCRIPTION OF THE DRAWINGS

FIG. 18 shows the cross section of an alternate embodiment with three air gaps.

DETAILED DESCRIPTION OF PREFERRED EMBODIMENTS OF THE INVENTION

Figure 1:
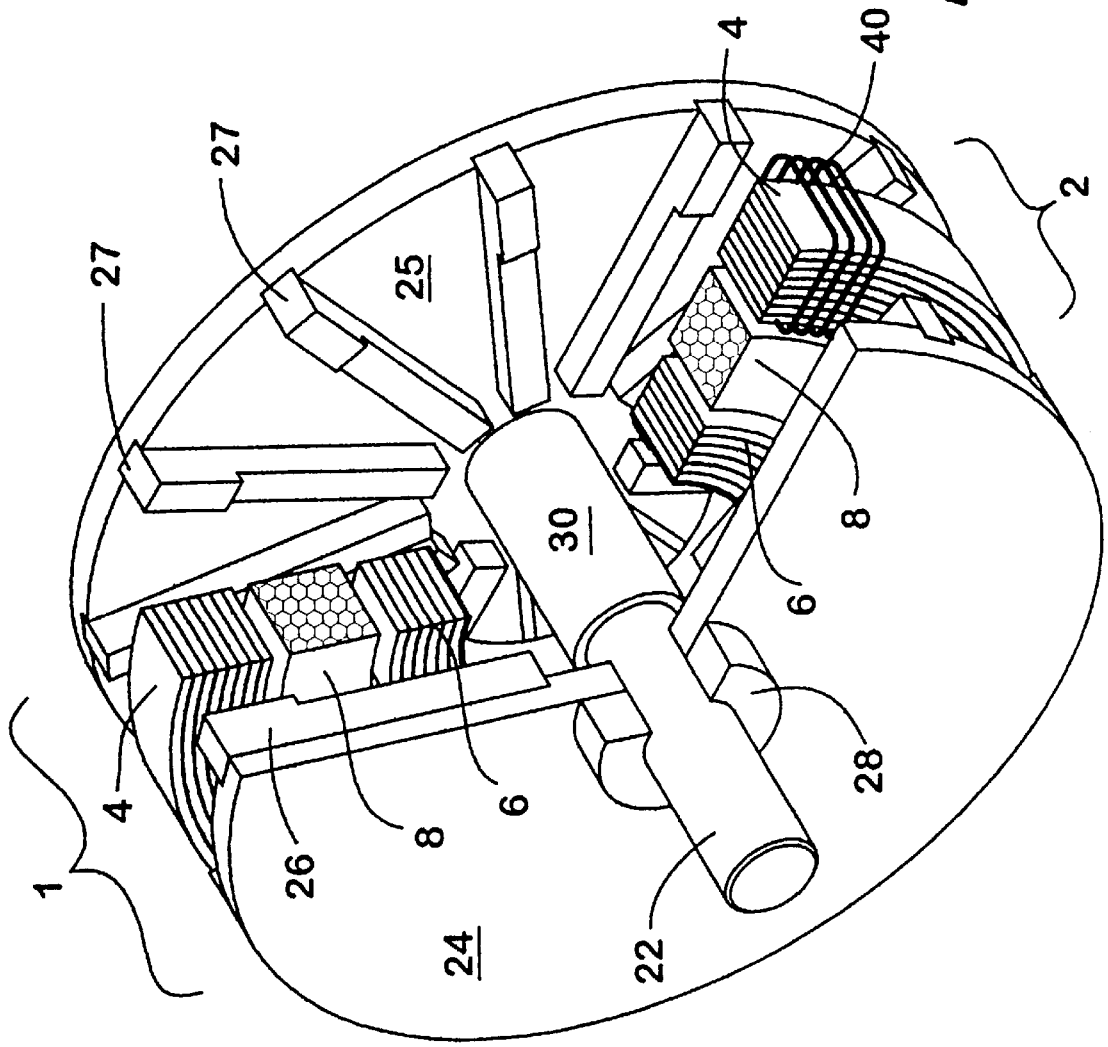
FIG. 1 shows a cut-away view of the low inductance electrical machine of the present invention.

In a first embodiment, the low inductance electrical machine of the present invention is configured as a high frequency alternator. Referring to FIG. 1, the low output inductance electrical machine 1 of the present invention includes a stator assembly 2 including an outer annular ring 4 and an inner annular ring 6, both made substantially of laminated electrical or magnetic steel or other suitable magnetic material with low core loss characteristics in order to minimize eddy current losses and hysteresis losses in the stator, and in this embodiment manufactured by making a spiral winding of appropriate material. An annular field coil winding 8 of insulated copper wire or other suitable conductor is wound toroidially and located coaxially between the two stator rings 4 and 6, and provides means by which the stator and rotor may be excited by an external current source. Armature windings 40 are wound poloidially around sections of the outer stator ring 4 in a specific manner which will be detailed later. The outer annular ring 4, in conjunction with the armature windings 40, acts as armature for this device. All of these stator elements, 4, 6, 8, and 40 are held together firmly and held stationary. The stator elements 4, 6, 8, and 40 may be glued together with materials like epoxy or secured by mechanical means such as radial pins and held stationary by attachment to an external housing.

The low output inductance electrical machine 1 also includes a rotor assembly which includes a common shaft 22, which may preferably be made of non-magnetic material, and two rotor disks 24 and 25, which may preferably be made of non-magnetic and poorly conducting material, each rotor disk also having secured to it an identical even number of rotor pole bars 26 and 27 oriented radially and made entirely of laminated electrical or magnetic steel or other suitable magnetic material with low core loss characteristics in order to minimize eddy current losses and hysteresis losses in the rotor pole bars. The rotor assembly may also include an optional axial spacer 30 which may be made of non-magnetic material and which serves to maintain the axial spacing of the two rotor disks 24 and 25. The rotor is also fitted with means 28 to fix the rotor disks 24 and 25 to the shaft to maintain the axial and rotary positions of the disks.

Figure 2:
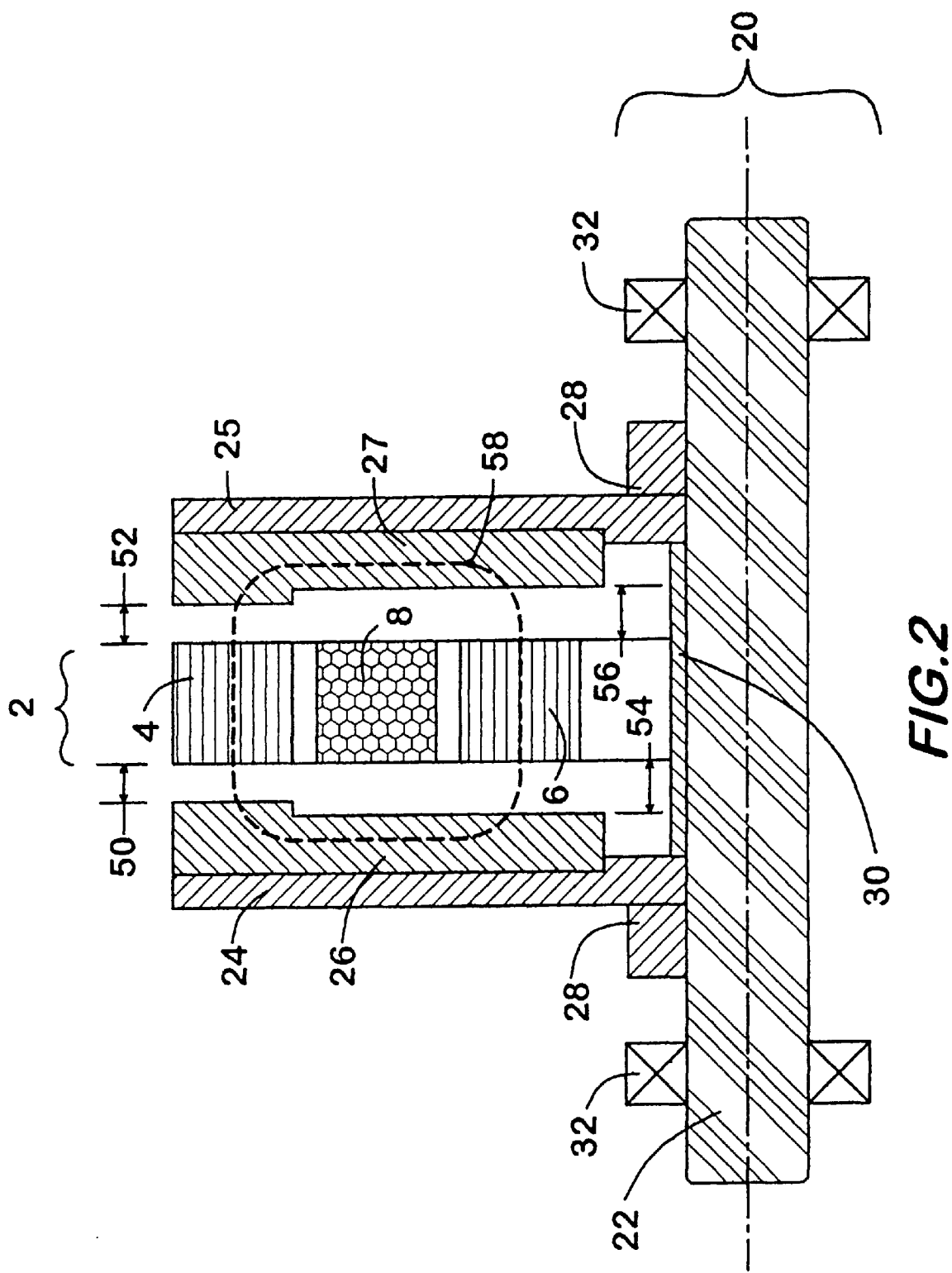
FIG. 2 shows a cross section of the low inductance electrical machine of the present invention.

FIG. 2 shows a cross section of the alternator. Means 32, such as bearings, are provided to maintain the axial and radial position of the rotor assembly 20 relative to the stator assembly 2 when shaft 22 is rotated relative to the stator assembly 2. FIG. 2 also shows the axial components of the magnetic path through the stator assembly 2 and rotor pole bars 26 and 27. The amount of flux 58 flowing is controlled by the excitation of the field coil 8 and the magnetic reluctance of the path which in turn is primarily controlled by the reluctance of the two axial air gaps 54 and 56 between the rotor pole bars 26 and 27 and the corresponding faces of the inner stator ring 6 and the reluctance of the two axial air gaps 50, 52 between the rotor pole bars 26 and 27 and the corresponding faces of the outer stator ring 4. Designs with only two air gaps near the stator, similar to air gaps 50 and 52, present a more usual configuration for a magnetic path. Adding the two additional air gaps, 54 and 56 in the magnetic path increases the excitation needed in the field coil but provides the following benefits:

(a) The added reluctance reduces the reaction flux that flows in this path when excited by the output current in the armature windings. This reduced flux flow through the field magnetic path reduces the magnetic energy stored in this path by the output current and thus is one important step in reducing the inductance of the output circuits of this device.

(b) As is well understood, in the absence of an air gap, flux flow tends to concentrate on the inner edges of corners of a magnetic pathway, thereby creating localized areas of increased flux intensity; such areas are prone to magnetic saturation and higher core losses. The introduction of air gaps 54 and 56 forces the flux to spread out across the width of the air gap and utilize the magnetic pathway more evenly, reducing localized concentrations, saturation, and core losses.

(c) For a typical two air gap machine, without the air gaps 54 and 56, the part that is the inner ring 6 of the stator of this invention would be replaced with a similar part attached to the rotor instead of to the stator. It would then be necessary to maintain a radial clearance between such a rotor part and field coil 8 so that it could rotate clear of interference with the stator. In this present invention the introduction of air gaps 54 and 56 allows inner ring 6 to be a fixed part of the stator, with no radial clearance requirements between itself and the field coil and with no requirements that the construction withstand centrifugal forces from rotation.

(d) The two air gap design of the present art presents complications in the construction of the rotor and the maintenance of two axial air gaps similar to 50 and 52, around a stator assembly, like the stator assembly 2, which is essentially enclosed by a monolithic rotor assembly. The introduction of air gaps 54 and 56 allows the pair of air gaps 50 and 54 and the pair of air gaps 52 and 56 to be adjusted independently through use of means 28 and spacer 30.

(e) Construction is simplified in that the shaft without rotor disks 24 and 25 can be inserted through the center of the stator assembly 2, and then disks 24 and 25 assembled into place over the ends of the shaft, independently positioned with optional assistance by means of spacer 30, and secured by fixing means 28 and bearing means 32.

(f) It can be appreciated from FIG. 2 that the shaft 22, spacer 30, rotor plates 24 and 25 are not essential components of the magnetic path and can be made of non-magnetic and poorly conducting materials in order to reduce core losses in these areas.

(g) The separation of the mass of the inner stator ring 6 from the rotor assembly 20 allows the rotor assembly 20 to be of relatively lightweight and relatively low inertia compared with rotors in which the equivalent flux path, represented by inner stator ring 6, is included in the rotor.

It will be noted from FIG. 2 and other figures to follow that the arrangement of the magnetic path in the alternator 1, wherein the outer stator ring 4, inner stator ring 6, field coil 8 are all stacked concentrically, and wherein the rotor pole bars 26 associated with rotor disk 24 all have the same magnetic polarity when the field coil 8 is energized, and wherein the rotor pole bars 27 associated with rotor disk 25 are all alike in having the complementary polarity, provides for a minimal amount of leakage flux due to field excitation. This leads to more optimal use of the magnetic material and lower core losses than designs with large amounts of leakage flux, such as in claw pole designs.

In general the magnetic materials of the alternator would be laminated magnetic or electrical steels or other suitable magnetic material with low core loss characteristics in order to minimize eddy current losses and hysteresis. In order to utilize the low core loss properties of the laminated materials the flux should flow within the plane of each laminate and not have components which flow perpendicular to the planes of the laminates. Induced voltages and the resulting eddy currents are oriented around changing flux lines in a plane perpendicular to the flux lines. It is desirable that the laminations be perpendicular to the plane of eddy currents in order to have the inter-laminar resistance impede the circulation of eddy currents. It is undesirable for the lamination to be parallel to the plane of components of the eddy currents since such components would then circulate relatively unimpeded, causing large losses. FIGS. 1 and 2 show that the magnetic material laminates are all oriented such that the flux flows within the plane of the laminates. The outer stator ring 4 and the inner stator ring 6 are preferably made of spiral windings of magnetic material, so that the laminates are essentially concentric with the axis of the shaft 22. Flux flow in these elements is axial and circumferential and fully within the (curved) plane of the laminates. In situations where the level of field flux 58 may be amplitude modulated at a desired power frequency, care must be taken to prevent the layers of spiral wrappings of the inner stator ring 6 or outer stator ring 4 from shorting from one layer to another; such short circuits amount to creating a closed conductor (around the shaft) through which axial components of flux 58 will flow. As is well known, there will be significant voltage and current induced into a closed conductor which encircles a time varying flux. Such currents are essentially eddy currents and waste power. The rotor pole bars 26 are made of laminations of magnetic material which are stacked in planes parallel to the plane containing the radial dimension through the center of the rotor pole bar 26 and the axis of the shaft 22. Similarly the rotor pole bars 27 are made of laminations of magnetic material which are stacked in planes parallel to the plane containing the radial dimension through the center of the rotor pole bar 27 and the axis of the shaft 22. The flux flow in the rotor pole bars 26 and 27 is essentially radial with slight axial components and this flow is fully within the plane of the laminates.

Figure 3A:
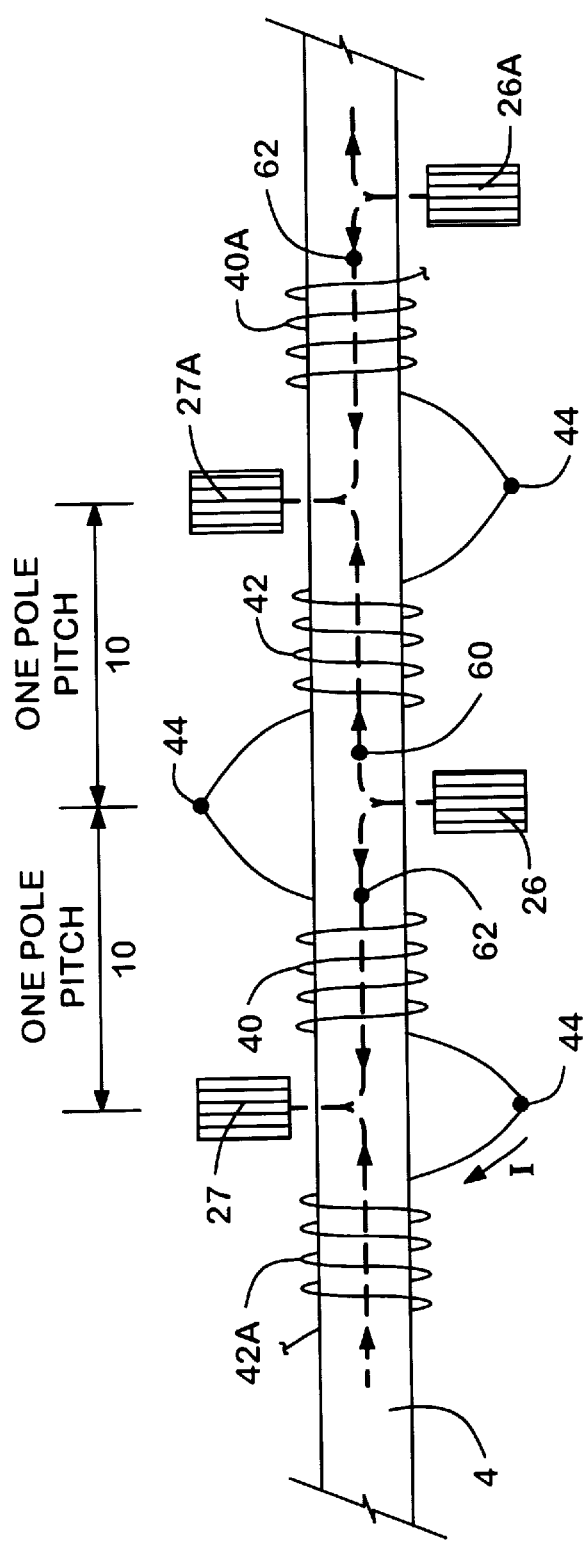
FIG. 3A shows a developed view along the circumference of the outer stator ring.

FIG. 3A shows a developed view along the circumference of the outer stator ring 4. In this invention, rotor disk 25 is shifted circumferentially one pole spacing 10 in relationship to rotor disk 24 so that rotor pole bars 26, 26A and rotor pole bars 27, 27A and their corresponding air gaps are staggered along the circumference of outer stator ring 4. Assuming that the field coil excitation is such that rotor pole bars 26 and 26A act as north poles and rotor pole bars 27 and 27A act as south poles, FIG. 3A shows a simplified schematic of the direction and distribution of field induced flux elements 60, 62 along the circumference of stator ring 4. Essentially the flux from north pole bar 26 splits with half going clockwise as flux flow 60 and half going counter clockwise as flux flow 62, each to flow to the nearby south pole bars 27 and 27A. As the rotor pole bars 26, 26A, 27, 27A, etc, move relative to the circumference of outer stator ring 4 the field induced flux 60, 62 enclosed by any one armature winding, such as 40, will alternate in direction and this time variation in flux will induce voltage within the winding.

To take advantage of this flux alternation, armature winding 40 is positioned on the outer stator ring 4 and wound a given number of turns in one direction, and complementary armature winding 42 is placed one pole spacing 10 away along the circumference of the outer stator ring 4 and wound the same number of turns but in the opposite direction so that when the windings are connected in series at reference point 44 the voltages caused by the change in flux as the rotor pole bars 26, 26A and 27 and 27A move relative to the outer stator ring 4 will augment each other. It will be clear that reference point 44 need not be a termination of the winding, but may be a point at which the direction of a continuous winding reverses. Due to the spacing of the reversing pattern of flux induced by the field excitation, there should be one complementary pair of armature windings 40 and 42 for each pair of complementary rotor pole bars 26 and 27.

Figure 3B:
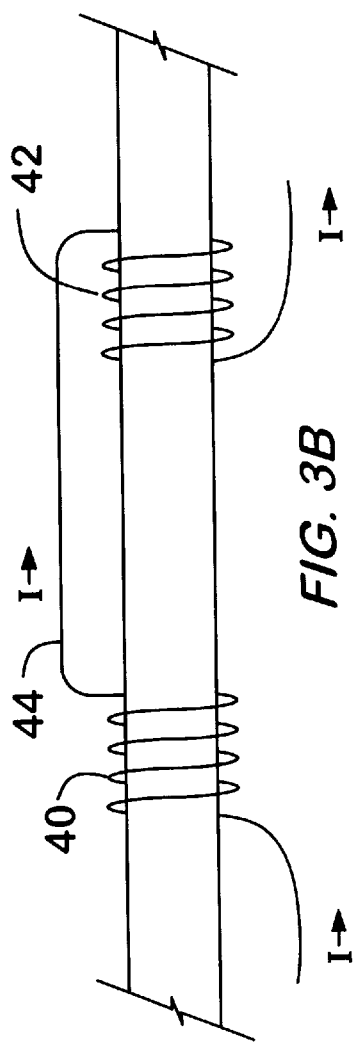
FIG. 3B shows an alternate configuration of the armature windings.

FIG. 3B shows an alternate configuration of the armature windings 40 and 42 placed on the outer stator ring 4 in complementary pairs and connected in series to show that the same effect of complementary pairs of armature windings can be achieved if windings 40 and 42 are wound in the same physical direction around outer stator ring 4 while the common connection point 44 is changed so that the load current "I" in armature winding 40 flows in a circumferential direction of reversed sense to the load current in armature winding 42.

In FIGS. 3A and 3B the complementary pairs of windings 40, 42 and 40A, 42A, etc., refer to a single phase armature circuit. Complementary pairs of windings for additional output phases, as needed, may be placed on the outer stator ring 4, the position of each phase being offset along the circumference of the outer stator ring 4 by the appropriate fraction of the pole spacing to effect the desired electrical phase shift. Such additional phase windings can be wound directly over each other, as will be described later, or over separate segments of the outer stator ring 4. In each phase the spacing between complementary windings 40 and 42 should be one pole spacing 10. Due to the spacing of the reversing pattern of flux induced by the field excitation, there should be one complementary pair of armature windings 40 and 42 for each phase for each pair of complementary rotor pole bars 26 and 27.

Superimposed on the flux induced by the field excitation will be the flux induced by any load currents flowing in the armature coils. At flux intensity levels below the magnetic saturation threshold of the magnetic material the effects of these different flux fields may be analyzed separately and added together linearly. For electrical and magnetic steels that threshold is often near 1.2 to 1.5 Tesla. For clarity the rest of this description of the preferred embodiment follows the assumption that the device is operating within its linear range. However, it will be understood that where the flux intensity level of superposed flux fields exceeds the saturation threshold of the magnetic material the magnetic response of the device will be non-linear. As with many electromechanical machines the present invention will still function in the non-linear range caused by magnetic saturation.

Figure 4B:
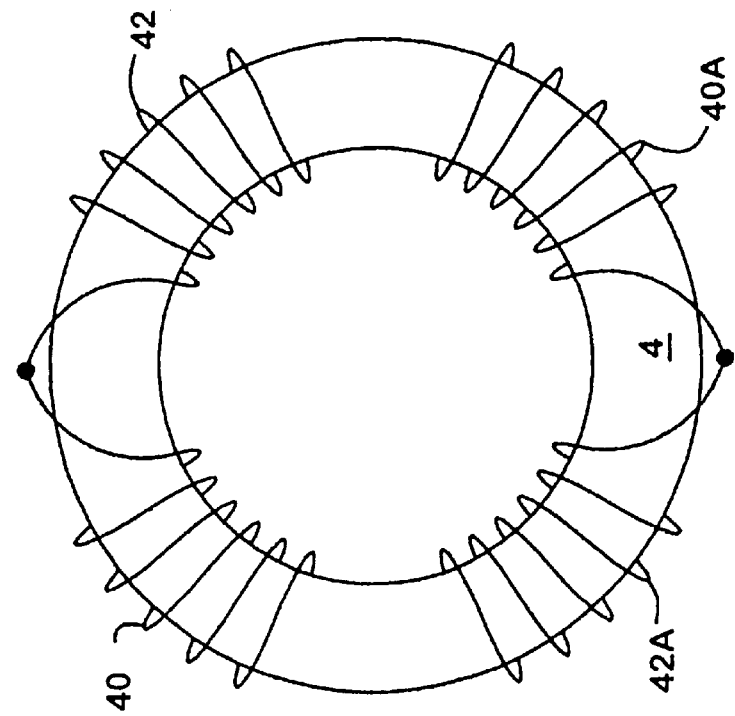
FIG. 4B is a schematic diagram of multiple pairs of complementary armature windings spaced around the circumference of the outer stator ring.
Figure 4A:
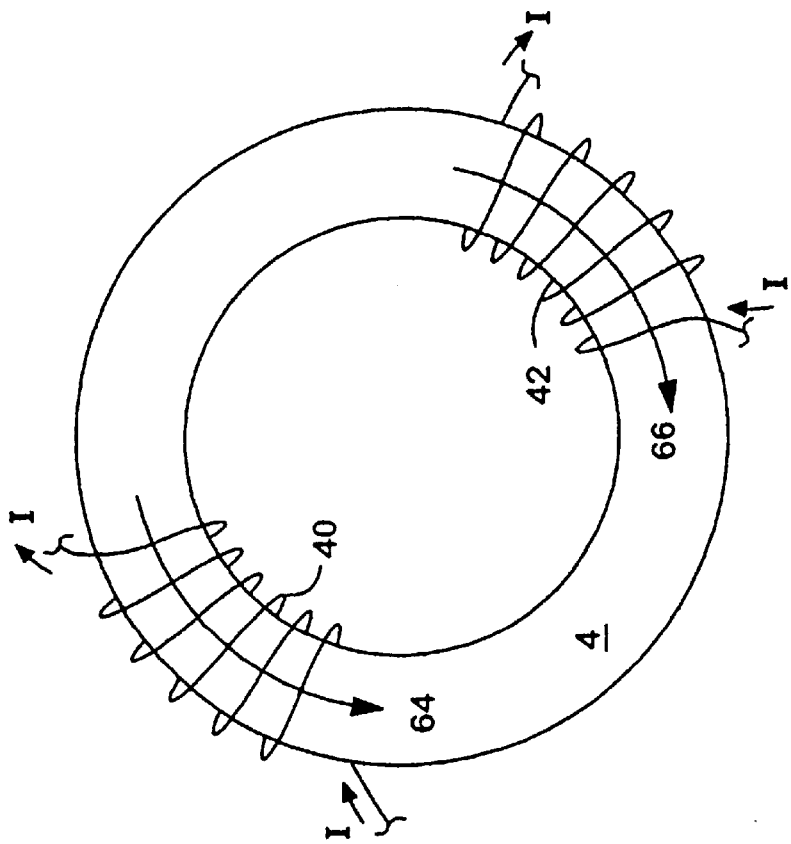
FIG. 4A is a schematic diagram of the magnetic pathways through the outer stator ring by flux generated by load current in a pair of complementary armature windings.

In FIG. 4A the load current in the armature pole winding 40 and the current in armature pole winding 42 will be of equal magnitude, and will induce flux flows 64 and 66 of equal magnitude, but flowing in opposite circumferential directions completely around the low reluctance material of the outer stator ring 4. These equal but opposite flux flows, 64 and 66 superimpose and effectively cancel the inductive effects of this circuit relative to the armature current.

While the superposition of the equal but opposite flux flows may be referred to as flux cancellation, in actual fact the two coils will still be linked by mutual inductance. A reactance voltage of one volt in coil 40 will produce a reactance voltage of one volt in complementary armature coil 42. By their complementary series electrical connection the net reactance voltage will be zero volts. This makes the armature circuit behave as a small value inductor (theoretically zero).

Complementary pairs of armature poles 40 and 42 are needed for this effective cancellation of circumferential flux flows 64 and 66. The resultant flux intensity level (B field in Tesla) in the circumferential direction within the outer stator ring 4 will be very low (theoretically zero) as a result of this cancellation (superposition) effect. The low resultant (net) flux intensity level will allow the outer ring 4 to carry the reaction flux from high load currents without going into magnetic saturation. Eddy current and hysteresis losses (core losses) in the outer ring 4 will be proportionate to the square of the low (net) flux intensity, and thus will be very low. The resultant output inductance due to flux flowing circumferentially all the way around the low reluctance path of the outer stator ring 4 will be very low (theoretically zero). In contrast, without the cancellation effect of the flux induced by load current in complementary armature winding 42, the flux intensity level, the tendency toward magnetic saturation, and the core losses in outer ring 4 due to load current in armature winding 40 would all be substantial and contrary to the objectives of this invention.

The advantages of low inductance, low flux intensity levels with low tendency toward magnetic saturation, and low core losses are obtained at each location within the magnetic circuits where the fluxes superimpose to effectively cancel. The advantages are proportionate to the amount of effective cancellation except for core losses which are related to the net flux intensity level squared.

It will be further appreciated from FIG. 4B that additional complementary pairs of armature windings 40a and 42a can be placed on the outer stator ring 4, members of the pairs spaced one pole spacing apart, and that each complementary pair will have a net effect of zero inductance on itself and a mutual inductance of zero on any similar complementary pairs located around the circumference of outer stator ring 4. In turn, it follows that the mutual inductance of a series of complementary pairs of armature windings and the mutual inductance between phases made of such pairs due to circumferential flux flows 64 and 66, taken together, will be (theoretically) zero.

It must be emphasized that without the arrangement of complementary pairs 40 and 42 high levels of net flux would flow around the circumference of the outer stator ring 4 due to the low reluctance of ring 4. This would result in high levels of magnetic intensity in the magnetic material, and saturation at relatively low levels of output current. In this undesirable arrangement the output inductance of the alternator would be very high and the mutual inductance of the various output phases would be very high. It will also be appreciated that the outer stator ring 4 could be a closed shape other than a toroid and still manifest the properties of cancellation of flux due to complementary pairs of armature coils 40 and 42.

Figure 5:
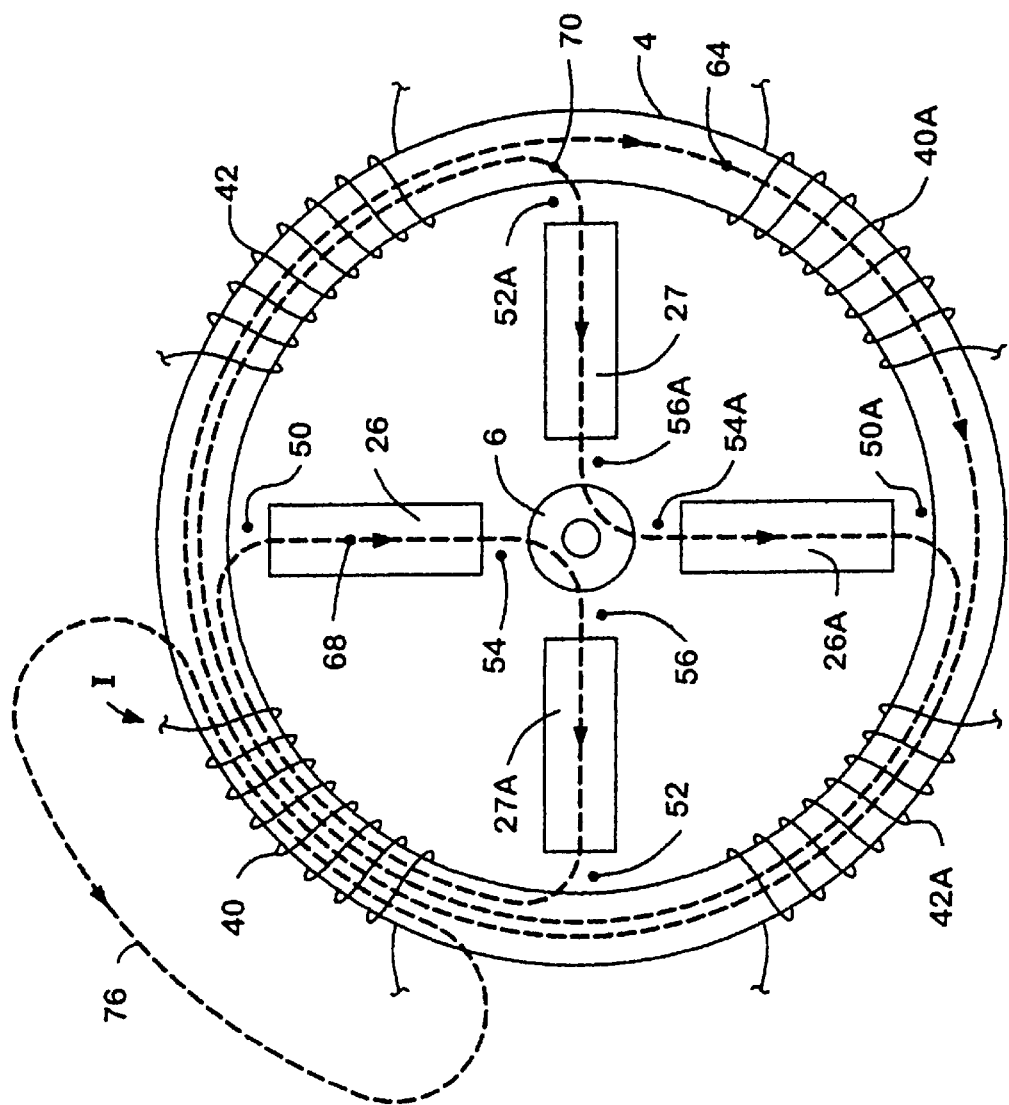
FIG. 5 is a schematic diagram of the magnetic pathways through the rotor by flux induced by load current in an armature winding.

FIG. 5 presents a schematic of the multiple flux paths excited by current in armature winding 40. It can be seen that in addition to circumferential flux flow 64, discussed above, there is other flux induced by the current in armature coil 40 and this flux does not complete the entire circuit through the low reluctance material of outer stator ring 4 but will complete a circuit through a higher reluctance pathway through the air gaps and through the rotor (load induced rotor flux, see flux flow 68 and 70), or locally through the air near the coil 40 (local flux, see flux flow 76). Additional design considerations, explained below, will minimize the effect of these alternate sources of inductance.

In FIG. 5, load induced rotor flux flows 68 and 70 show the magnetic pathways in the rotor taken by flux induced by load current in armature winding 40. Magnetic energy is stored along these flux paths, particularly in the high reluctance air gap areas. If the reluctance of the metal pathway is low enough to be ignored, the flux levels in these paths will be determined primarily by the excitation of the load current and by the reluctance of the air gaps 50, 54, 56 and 52 along the path of flux flow 68 and by the reluctance of the air gaps 52A, 56A, 54A, and 50A along the path of flux flow 70. Due to symmetry this would lead to essentially equal flux flows in path 68 and 70, and equal energy storage in each of the four air gaps 50, 50A, 52, 52A and equal energy storage in each of the four air gaps 54, 56, 54A, 56A. This energy storage would manifest as self inductance in armature winding 40. Also since a portion of this flux flows through armature windings 42 and through armature windings from other phases there will be mutual inductances between armature winding 40 and other armature windings.

Figure 6:
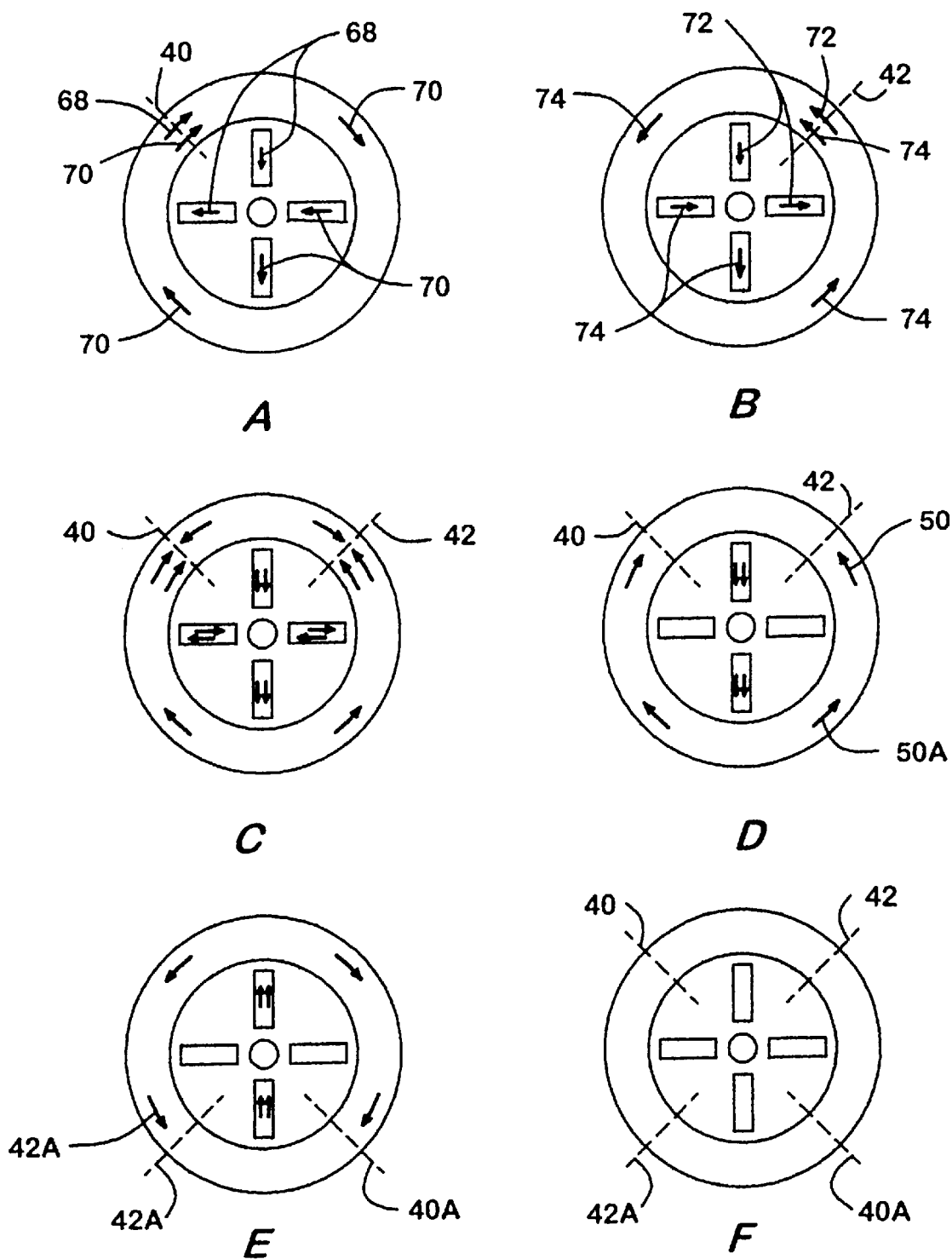
FIG. 6 includes FIGS. 6A–6F that show a scheme for analyzing the mutual inductance of rotor flux flows using various configurations of armature coils.

FIGS. 6A–F shows a schematic for analyzing the self and mutual inductance of rotor flux flows using various configurations of armature coils. FIG. 6A shows the components of flux in each branch of the flux flow path for rotor flux flows 68 and 70 induced by current in armature coil 40. (Note that circumferential flux flow 64, discussed above, is not shown.) FIG. 6B shows a similar analysis for flux flows 72 and 74 induced by the load current flowing through complementary armature winding 42, note the change in direction of flux flow due to the reversed winding direction of armature winding 42. FIG. 6C shows the flux flows, 68 and 70, superimposed onto flux flows 72 and 74. As noted above, all of these flux flows will be of equal magnitude if the currents and numbers of turns are essentially equal in both armature coils 40 and 42 and if the reluctance of the magnetic material is small enough to be ignored. FIG. 6D shows the net flux flow; equivalent flows in opposite directions are assumed to "cancel" the effect of each other. It can be seen that the induced rotor path flux caused by equal currents in the complementary pair of armature windings 40 and 42 do not cancel but will have a net inductance and a high flux intensity level in some of the air gaps 50 and 50a, in some sections of the outer stator ring 4 and in some of the rotor pole bars 26, 26A. FIG. 6E shows the net flux caused by a second complementary pair of armature windings 40A and 42A placed diametrically on the outer stator ring 4 from armature windings 40 and 42. (Confer with FIG. 4B.) Note that these net fluxes are the reverse of those in FIG. 6D. FIG. 6F shows the net flux flows induced by equal currents in the two pairs of complementary armature windings 40 and 42, and 40A and 42A. Note that the net flux in all air gaps and all sections of the magnetic path are zero. This means that the mutual inductances of these four armature winding coils 40, 42, 40A and 42A will combine to eliminate any net inductive effect from induced rotor path flux. This also shows that the net mutual inductive effect of the induced rotor path flux from this set of armature windings on any other similar set of armature windings, say of a different output phase, placed on the circumference of outer stator ring 4 will also be zero. Therefore, the contribution of these magnetic pathways to output inductance and core losses will be very low (theoretically zero.)

The inventors have discovered that this condition of the effective cancellation of inductance for induced rotor path flux holds for cases in which the total number of rotor pole bars (26 and 27 combined) is a number evenly divisible by four, i.e. where there is an even number of pairs of rotor pole bars., and where there is one complementary pair of armature windings, members of the pair spaced along the circumference of the outer stator ring 4 at one pole spacing 10, for each pair of rotor pole bars. The inductance cancellation does not work for machines with a single pair of rotor pole bars combined with a single complementary pair of armature windings (as shown in FIGS. 6A–6D), nor for three pairs of rotor pole bars combined with three pair of armature windings; in each of these cases there is a non zero net flux flow and a high net inductance and a high flux intensity level in some of the air gaps 50 and 52, etc., in some sections of the outer stator ring 4 and in some of the rotor pole bars 26, and 27 etc. The provision for a even number of pairs of rotor pole bars combined with an equivalent number of complementary pairs of armature windings with proper placement allows for effective cancellation of the inductances and inter-phase mutual inductances due to load-current-induced-flux circulating in the outer stator ring 4 and due to load-current-induced-flux circulating through the rotor.

For purposes of clarity, FIGS. 5 and 6A–6F have been laid out with the rotor pole bars 26, 26A, 27 and 27A and their associated air gaps are shown stacked radially inside the outer stator ring 4. This is similar to the position of rotor poles in a claw pole type alternator and the analysis given here could apply to alternators with claw pole rotors as well as to alternators with the rotor structure shown in FIGS. 1 and 2. Furthermore, while FIGS. 5 and 6A–6F show the four air gap configuration of this invention, the conclusions of the analysis would not be altered by the elimination of air gaps 54, 54A, 56 and 56A, etc., as in the more usual two air gap design.

It will be appreciated that the above stated assumption of negligible reluctance of the magnetic materials in the magnetic materials portion of the flux paths is not strictly true and that there will be some differences in the magnitudes of flux flows 68 and 70, and therefore there will be imperfect "cancellation" of the flux and its effects and some net inductance will result. There will also remain the effect of local flux 76 for each armature winding resulting in additional self inductance of the output. Because of the long, high reluctance, air return path of the local flux 76, the flux flow 76 will be low compared to the flux levels carried in the low reluctance magnetic materials. It must also be noted that local flux 76 may link with other near by armature windings and result in some net mutual inductance. It will be appreciated that these net inductances will be small compared to the output inductance that would be developed without cancellation. The net result will be low output inductance for this alternator, along with low core losses and capability to handle large load currents without saturation of the magnetic material.

Figure 7:
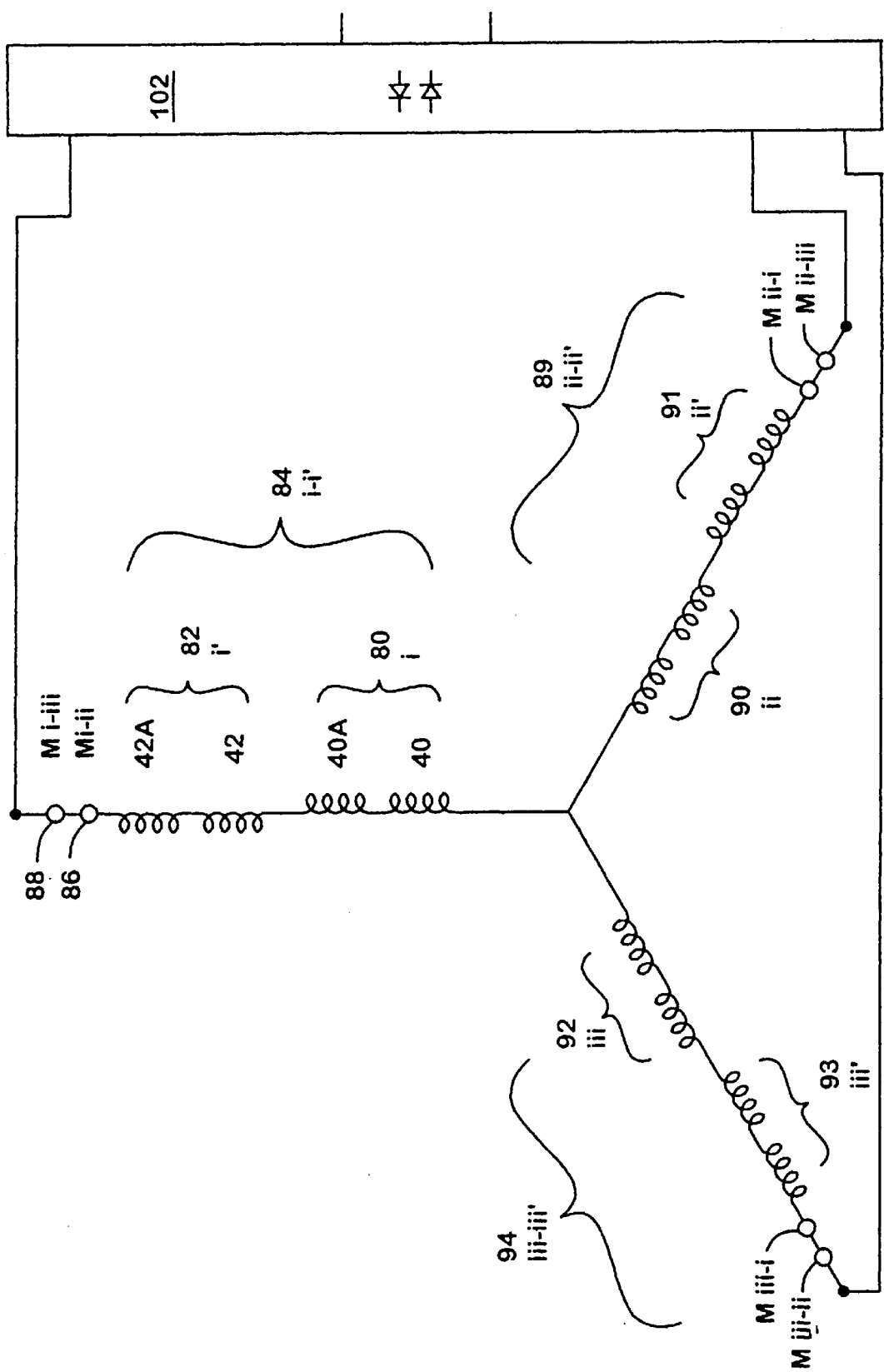
FIG. 7 is a schematic diagram of a multiphase alternator winding in an alternative embodiment of the present invention.

FIG. 7 shows a schematic of a multiphase alternator winding, three phases in this case, in which the complementary pairs of armature windings 40, 42 and 40A, 42A are connected in series to form Phase-i 80 and Phase-i' 82 outputs which are further combined into Phase-i—i' 84, which circuit is further impacted by Mi–ii 86 and Mi–iii 88, the mutual inductances of flux from Phase ii 90 combined with Phase ii' 91 (to form Phase ii—ii' 89) and Phase iii 92 combined with Phase iii' 93 (to form Phase iii—iii' 94) respectively on the voltage in Phase i—i' 84. Although most of these inductances and mutual inductances have been shown to be limited to the effect of local flux 76 in this invention, it will be understood that it is important to minimize these effects and the resultant output inductance. FIG. 7 also shows an optional external rectifier circuit 102, which may be used to produce a rectified output in conjunction with the high frequency alternator configuration of this invention in a manner well understood in the art. Although the windings of the three phases in FIG. 7 are shown as being connected in the common "wye" configuration, it will be understood that the advantages of the present invention can be applied equally well to the familiar "delta" configuration.

Figure 8:
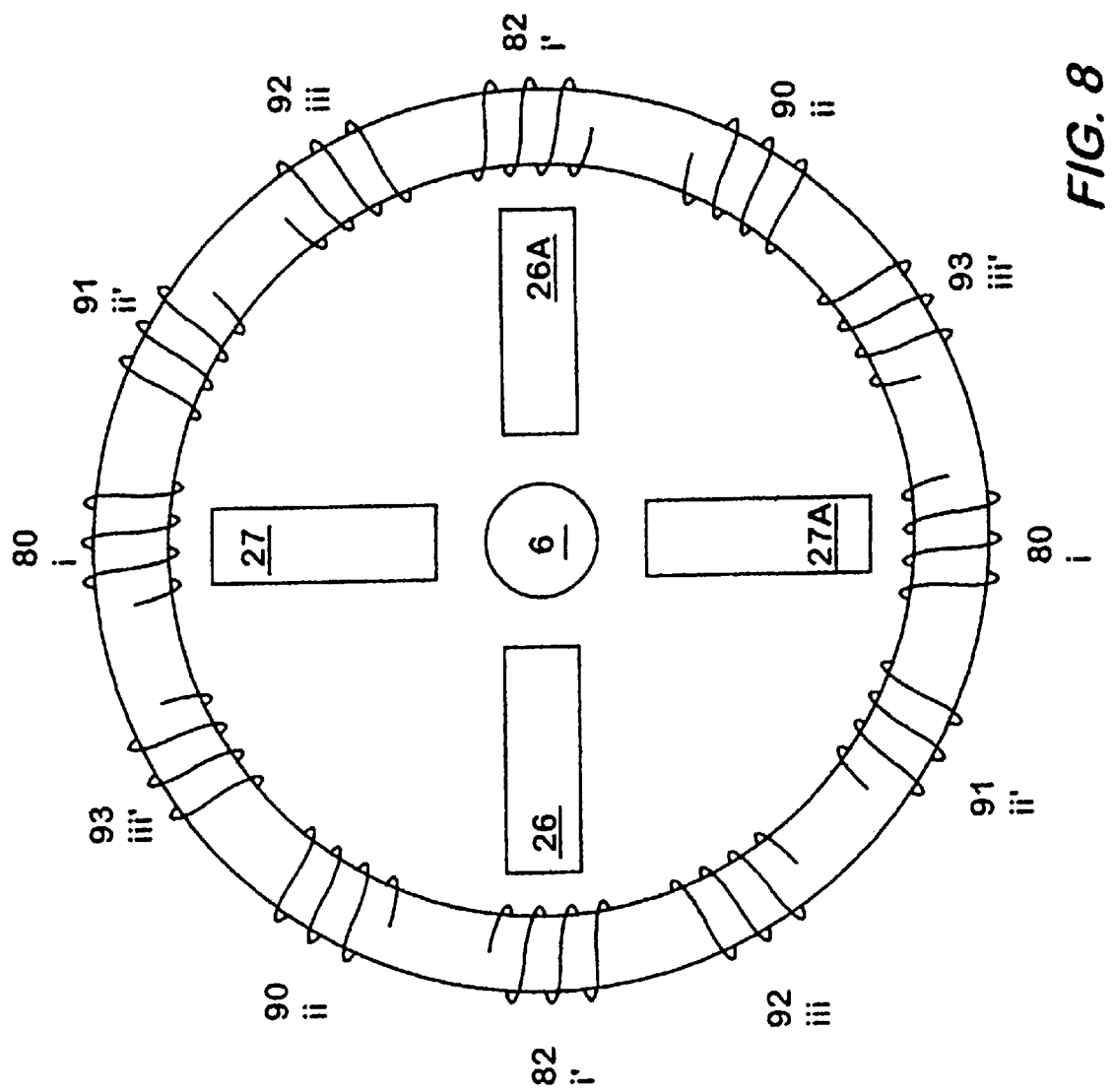
FIG. 8 shows one method of winding three phases around the outer stator ring.

FIG. 8 shows one method of winding three phases around the outer stator ring 4. In this method the coils of each armature winding are concentrated along a discrete section of the circumference of outer stator ring 4. Adjacent windings take the order shown in FIG. 7 (i, ii', iii, i', ii, iii', i . . . ), with each winding being of opposite directional sense to its nearest neighbors. This method has the advantage that the instantaneous field flux is nearly the same through all turns of one armature winding 40 which results in high voltages as the flux changes due to rotor motion.

Figure 9:
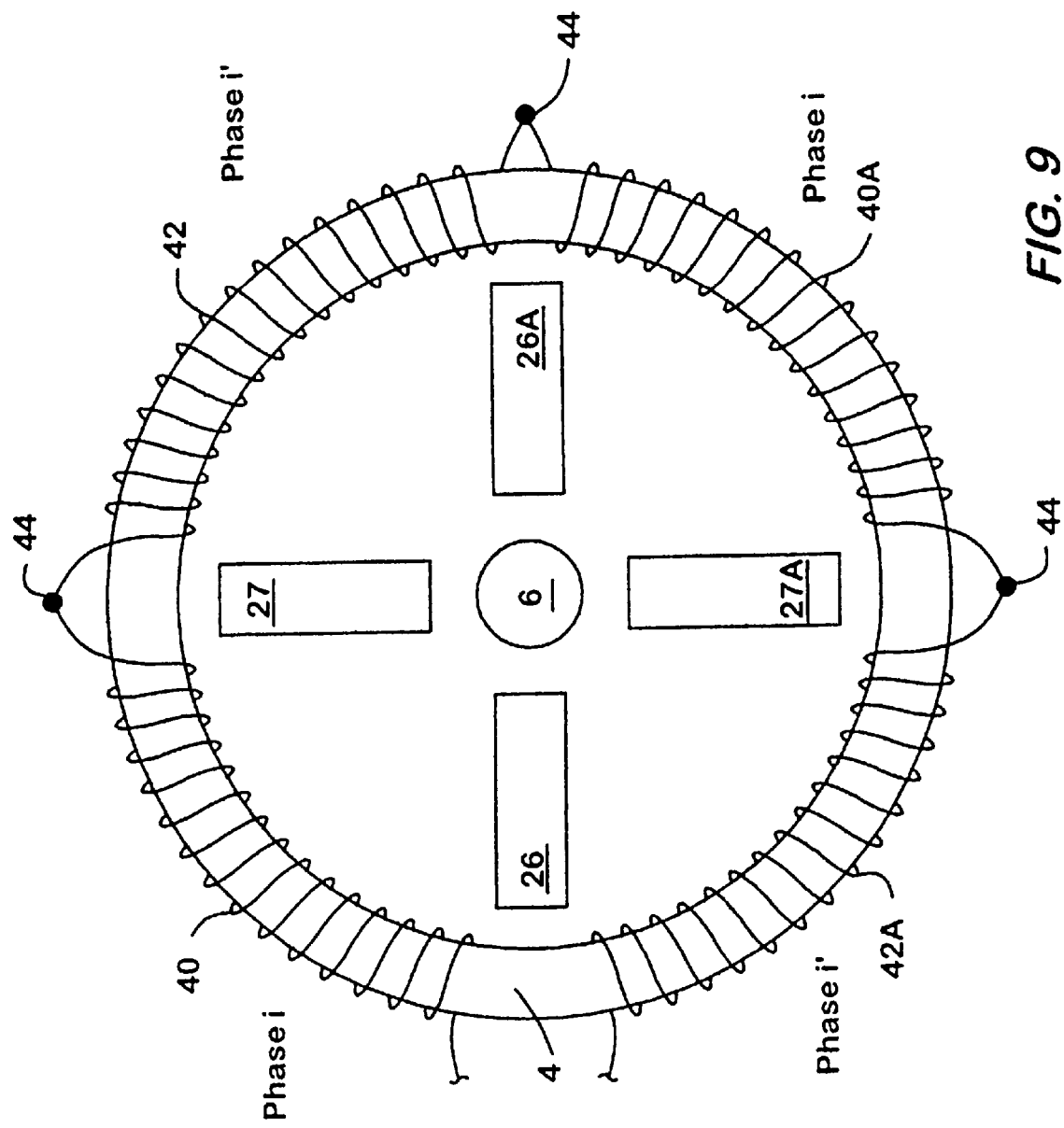
FIG. 9 shows an alternate method of winding three phases around the outer stator ring.

FIG. 9 shows an alternate method of winding a single phase around the outer stator ring 4 in which the winding 40 (phase i) is spread out to occupy most of the circumference of the outer stator ring 4 for a distance equal to one pole pitch or pole spacing 10 (i.e. over most of the distance between rotor pole bars 26 to 27), and in which complementary winding 42 (phase i') is spread out to occupy most of the complementary circumference from rotor pole bar 27 to the next rotor pole bar 26A. This configuration reduces the local inductance of phase i/i' 84 about half as compared to the configuration of FIG. 8 in which the windings 40 and 42 are concentrated in smaller arcs along the circumference of the outer stator ring 4. Phases ii/ii' and iii/iii' may be accommodated in this configuration by being wound over (coaxial with) phase i/i' 84 with the position of the winding reversals 44, 44A offset by one third of the pole spacing. More or fewer phases could be accommodated by appropriate adjustment of the phase offset. The mutual inductance between phases is also reduced by about half for this alternate configuration.

Figure 10:
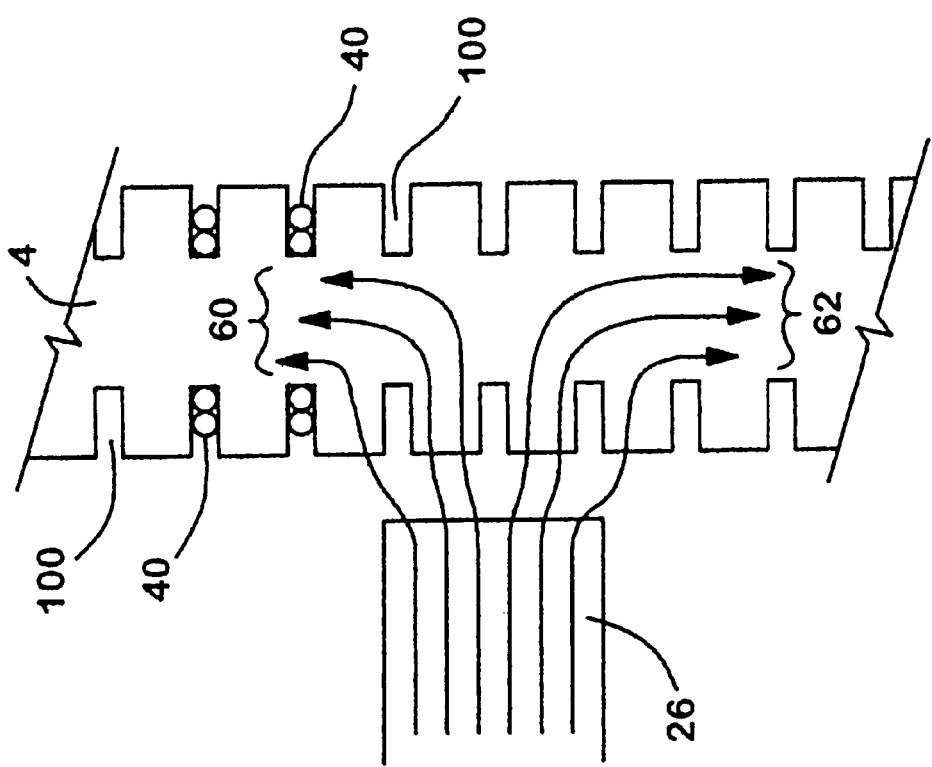
FIG. 10 shows a detail of slots in the outer stator ring to accommodate armature winding coils.

It will be understood for this alternate configuration that winding phases i/i' and ii/ii' and iii/iii' over one another may require the air gap 50, 52 to be quite large in order to provide clearance between the windings, 40 and 42 and the rotor pole bars 26 and 27. The air gap dimension has design implications for the circumferential distribution of flux along the outer stator ring 4 and thus through the windings 40 and 42; thus the air gap dimension influences the voltage waveform produced by motion of the rotor. It is desirable to be able to control the air gap dimension independently of other design factors in order to control the induced voltage waveform of the alternator. In order to accommodate small air gap length, if required, FIG. 10 shows an alternate embodiment in which the outer stator ring 4 may be formed with surface grooves 100 running in a nearly radial direction along both air gap surfaces of the magnetic material into which the individual turns of windings 40, 42, 40A, 42A etc, of phases i/i', ii/ii', and iii/iii' may be placed. It will be appreciated that this grooved outer 4 ring may be used with any winding scheme so that the air gap dimension can be controlled independently of the winding arrangement. As shown in FIG. 10 the magnetic material between the grooves allows the field induced flux 60, 62 to concentrate and pass around the windings, effectively reducing the air gap.

The low inductance output of the configuration of this invention is valid for single and multiphase alternators, regardless of the type of load.

For use in high frequency alternators in which the multi-phase voltage output will be further rectified or switched by solid state means to create DC or controlled frequency AC power, further low inductance embodiments are possible.

Figure 11:
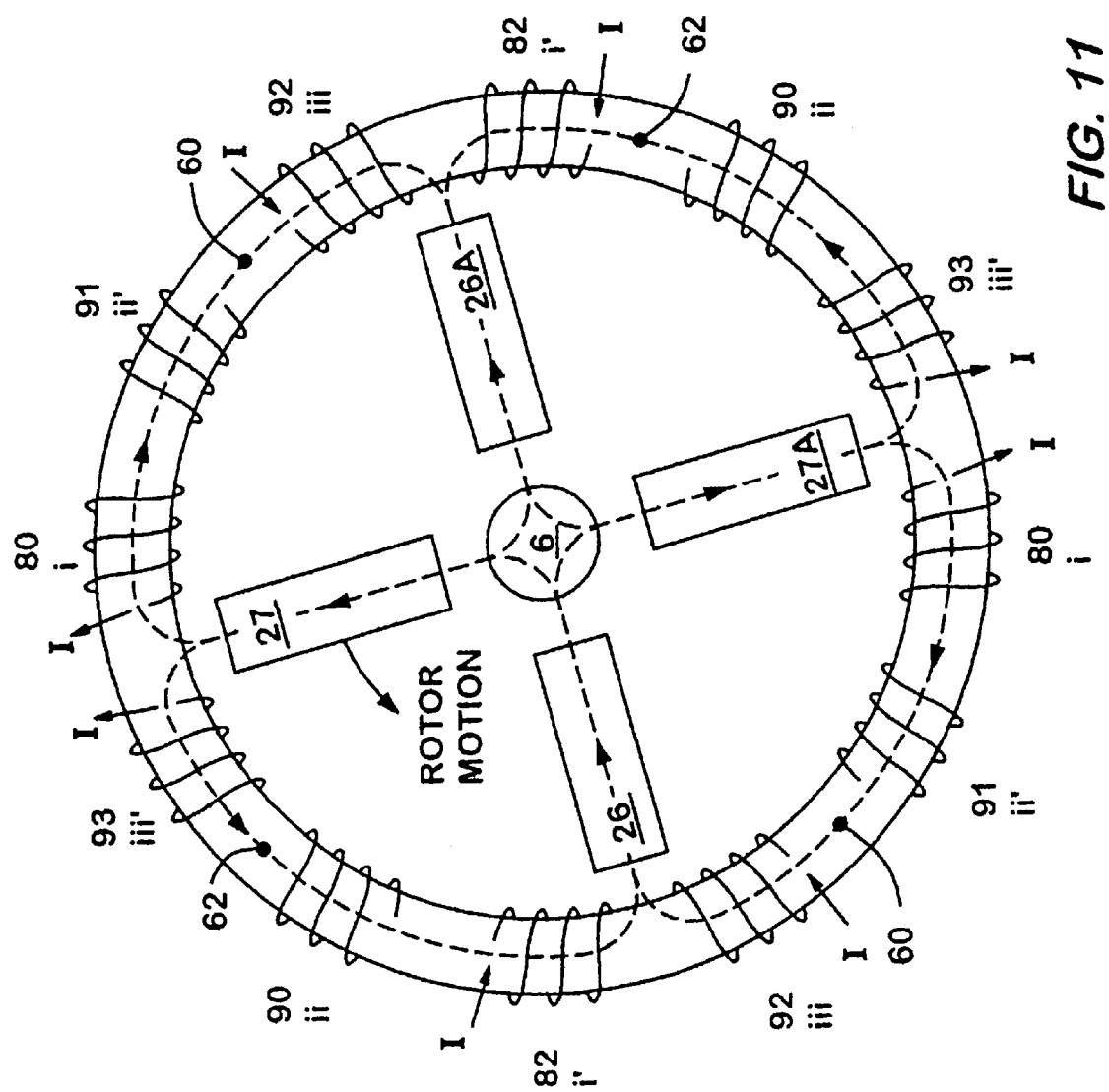
FIG. 11 shows the pattern of armature reaction currents for a three-phase alternator with rectified output.

The inventors have discovered that for the particular case of a three phase alternator connected to an external rectifier circuit 102 the limiting condition of an even number of pairs of rotor pole bars may be removed. By reference to FIG. 11 it will be understood that the armature coils of phases i/i' and iii/iii' are in regions where the field induced flux elements 60, and 62 are changing rapidly as the rotor pole bars 26, 27 move. The rapid change in flux will induce high voltage within phases i/i' and iii/iii'. It will be understood by those skilled in the art that, for a rectified three phase system, the armature coils of phases i/i' and iii/iii' will be conducting with the same (series) current. During this time phase ii/ii' is in an area of peak (slowly changing) field induced flux, will have low voltage, and due to the effect of the rectification will conduct no current. It will also be understood that the direction of the induced current in coils of phases i' and iii', as shown in FIG. 11, will each produce flux traveling in opposite directions through the stator ring 4; these equal and opposite fluxes therefore effectively cancel. This produces a situation in which the net effective (flux producing) current between poles bars 26 and 27 is zero; in such a case the net flux shown in FIG. 6D is also zero meaning that there is no inductive effect of flux flowing through the ring or through the rotor, even with an odd number of pairs of complementary armature windings. Thus, for this particular embodiment the restriction of an even number of rotor pole bar pairs may be removed. There must still be one complementary pair of armature windings, members of the pair spaced along the circumference of the outer stator ring 4 at one pole spacing 10, for each pair of rotor pole bars for each phase.

It will be appreciated that the field coil 8 allows for control of the excitation level and the output voltage level for this device when used as an alternator so that the output voltage can be held constant under varying conditions of shaft speed and load. Obviously the field excitation system including field coil 8 could be eliminated and either inner stator ring 6 or the rotor pole bars, 26 and 27 could be replaced with permanent magnets of appropriate polarity and used with the armature winding methods herein disclosed to produce a low-armature-inductance permanent magnet alternator wherein the output voltage would depend upon the speed of the shaft. Such devices find use in some systems and low armature inductance would be an advantage.

In an alternate embodiment of this invention, it may be used as a low inductance stepper motor. For this embodiment the field 8 is excited to produce magnetic polarization of the rotor pole bars 26 and 27. The armature coils 40 are then excited in complementary pairs 40 and 42 (in order to preserve the low inductance features of this invention) in specific sequence to attract the rotor pole bars 26 and 27 to a succession of positions around the circumference of the outer stator ring 4, thereby determining the position of the shaft 22. Since the torque is produced by attraction of the pole bars 26 and 27 the air gap along the outer stator ring 4, the moment arm is long and the potential torque is high. The pull-out torque is controllable by the level of field excitation in coil 8. The relatively low rotor inertia described in the four air gap alternator embodiment is useful in this stepper motor configuration.

In another embodiment, this invention may be used as a smooth and quiet synchronous motor. It will be appreciated that even with excitation of the field coil 8, the rotor assembly 2 has no preferred position along the circumference of the outer stator ring 4 unless there are currents in the armature windings 40 to establish local magnetic flux patterns 76. That means there is no cogging torque except that provided by the excitation of the armature. This can be used to establish a smoothly operating, quiet synchronous motor. For this embodiment the field 8 is excited to produce magnetic polarization of the rotor pole bars 26 and 27. The three armature phases i—i' 84, ii—ii' 89, and iii—iii' 94 are excited (preserving complementary pairs of armature windings 40 and 42 in order to achieve the low inductance benefits of this invention) by three phase sinusoidal power to create a magnetic flux wave that travels smoothly around the circumference of the outer stator ring 4 and attracts the rotor pole bars 26 and 27 to follow smoothly around the circumference of the outer stator ring 4, thereby causing shaft 22 to rotate smoothly. The pull out torque is controllable by the level of field excitation in coil 8.

It will be appreciated that in an additional embodiment this invention may be used in one of the above cited motor modes and then, when regenerative breaking is required, the device may be easily switched to operate in its alternator mode. During regenerative braking the alternator output voltage may be controlled independently of shaft speed by varying the level of field excitation in field coil 8. The output voltage of the armature coils may be connected to an external rectifier circuit to provide controlled DC power for recharging batteries or other energy storage processes. An external feedback control circuit can modulate the field excitation current in order to regulate the output current and voltage as needed for proper recharging of storage batteries even as the shaft speed slows due to braking action.

Figure 12:
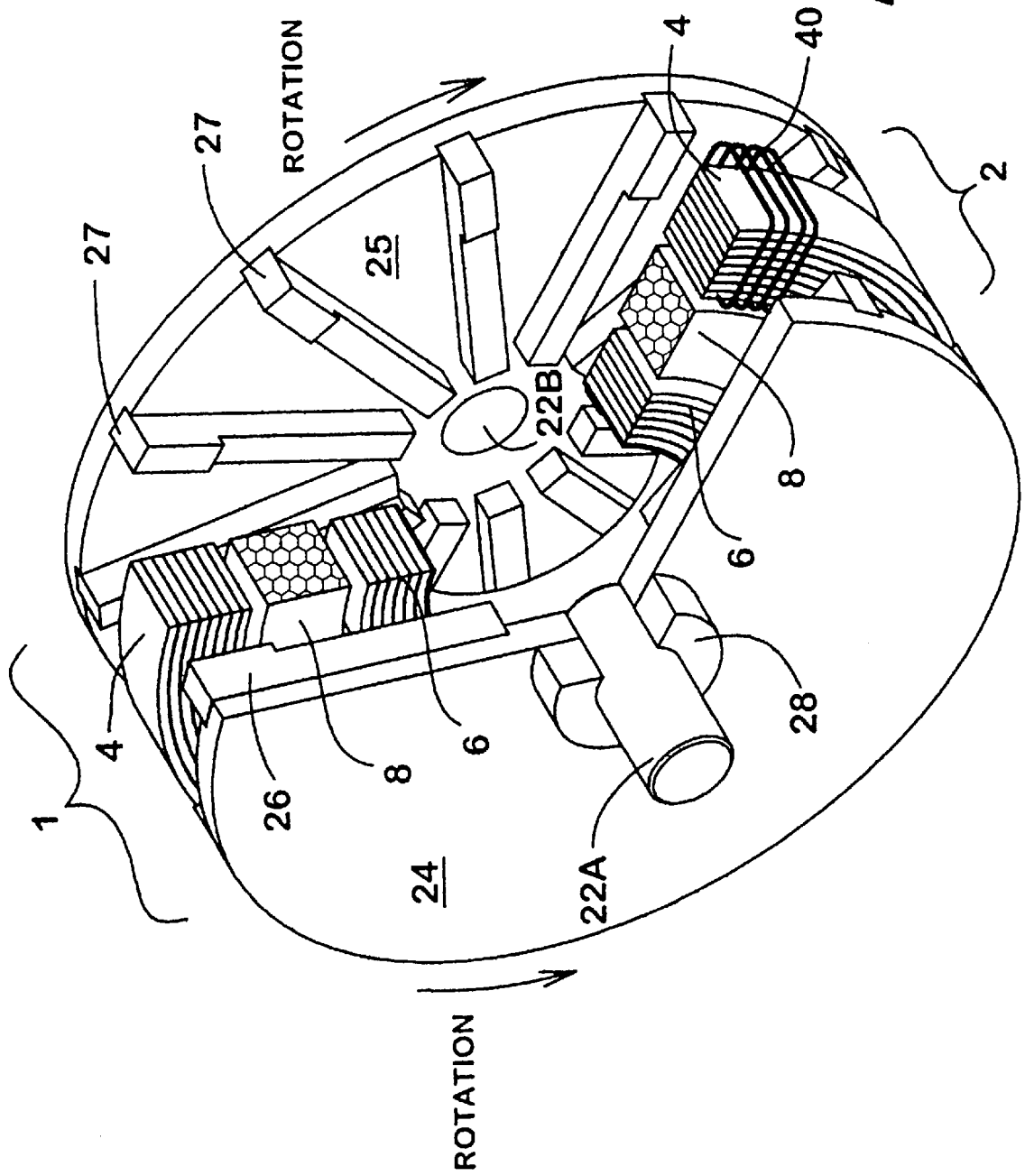
FIG. 12 shows an alternate embodiment for use in storing and retrieving energy as flywheel momentum with counter-rotating rotors.
Figure 13:
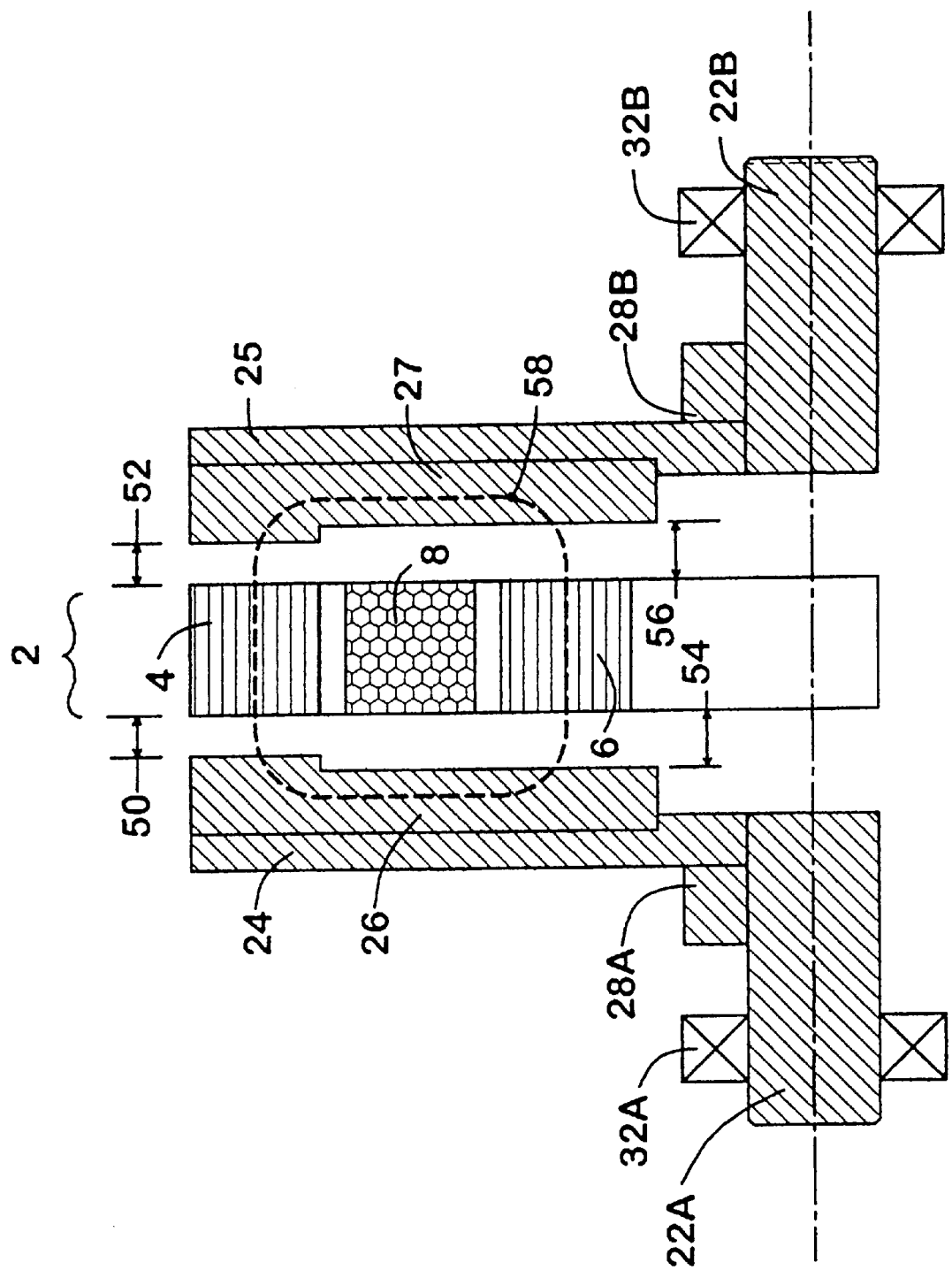
FIG. 13 shows a cross section of the alternate embodiment with counter-rotating rotors.

In another embodiment the low inductance electrical machine 1 may be made useful for storing and retrieving energy from flywheel devices. As shown in FIG. 12, in this embodiment energy is stored and recovered from the momentum of two counter-rotating rotor assemblies. Independent co-linear shafts 22A and 22B are attached to rotor disks 24 and 25, respectively. Rotor disks 24 and 25 may preferably be made of non-magnetic and poorly conducting material, each rotor disk also having secured to it an identical even number of rotor pole bars 26 and 27 oriented radially, space evenly around the circumference of each rotor disk, and made entirely of laminated electrical or magnetic steel or other suitable magnetic material with low core loss characteristics in order to minimize eddy current losses and hysteresis losses in the rotor pole bars. As shown in FIG. 13 the rotors are also fitted with means 28A and 28B to fix the rotor disks 24 and 25, respectively to the shafts 22A and 22B, respectively, to maintain the axial and rotary positions of the disks. Bearing means 32A and 32B are necessary to provide axial and radial alignment of the two shafts 22A and 22B, respectively, and of the two rotor disks 24 and 25.

Figure 14:
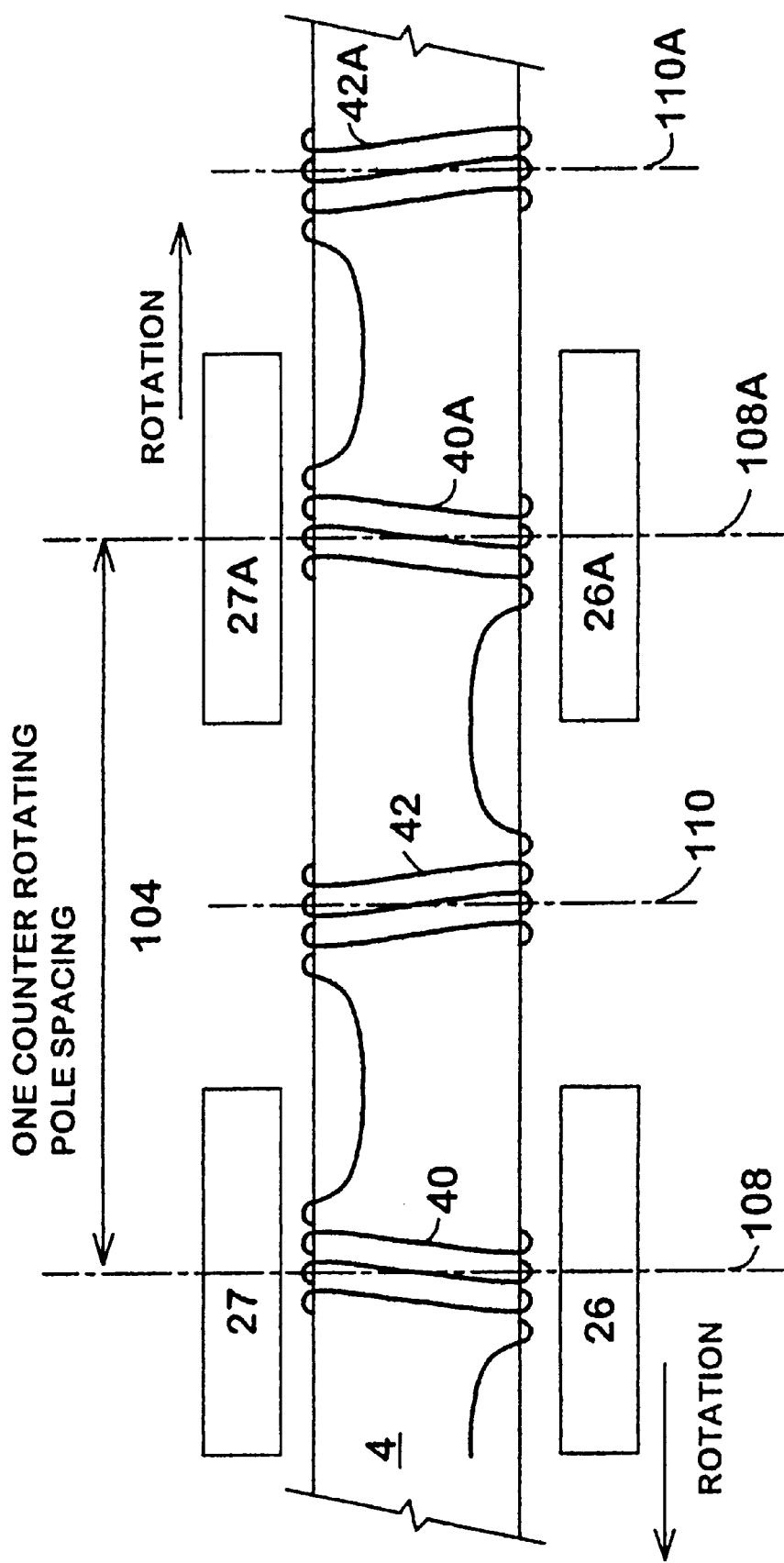
FIG. 14 shows a developed view along the circumference of the outer stator ring for the alternate embodiment with counter-rotating rotors.

The inventors have found that, for optimal performance in this embodiment, the circumferential projection of the rotor pole bars 26 and 27 onto the outer stator ring 4 should cover approximately 50% of the counter-rotating rotor pole spacing 104 as shown in FIG. 14, but poles of other widths may also be used. As in previous embodiments, there is one complementary pair of armature windings 40 and 42 per pair of rotor pole bars 26 and 27. This embodiment has a single phase of complementary pairs of armature windings. Armature windings 40 are located circumferentially along the outer stator ring 4 at the rotor-pole-alignment-position 108, 108A, etc., these being the circumferential positions at which the counter-rotating poles momentarily align as shown in FIG. 14. Complementary armature windings 42 are located at location 110, 110A, etc., midway between the rotor-pole-alignment-positions.

Figure 15A:
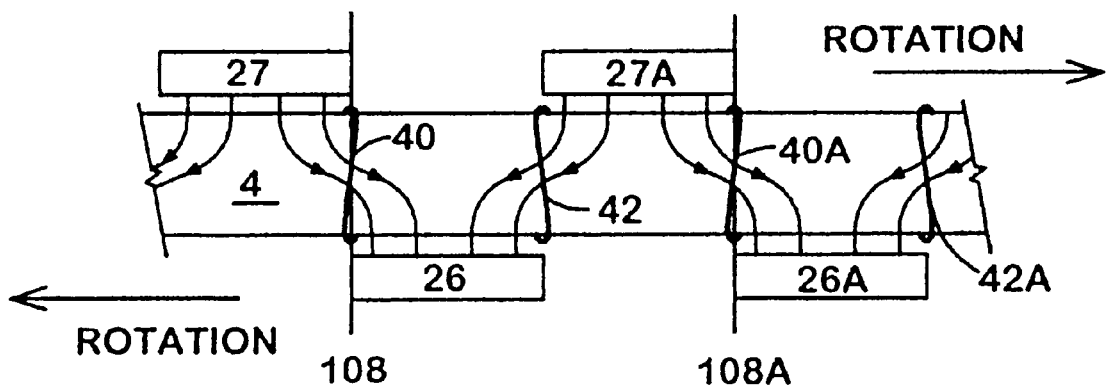
FIG. 15 includes FIGS. 15A, 15B, 15C which show the field excited flux distribution along a developed view of the outer stator ring for the alternate embodiment with counter-rotating rotors in various positions.
Figure 15B:
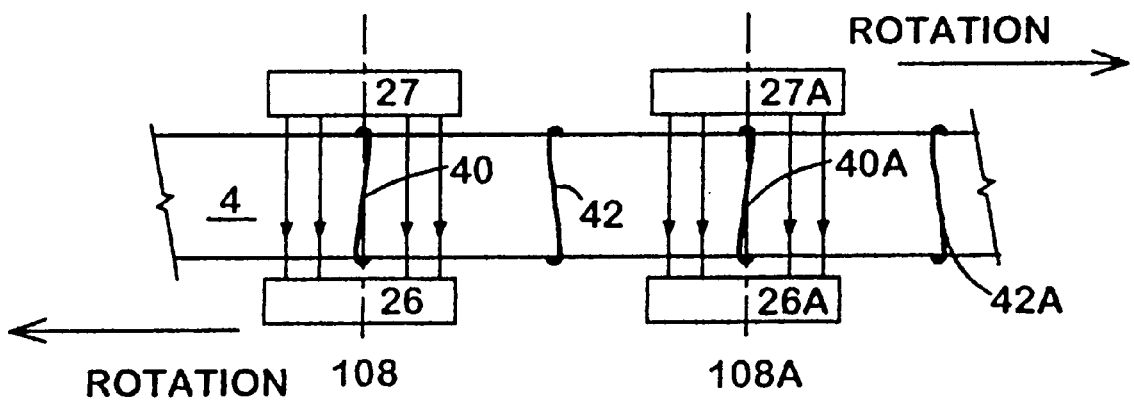
Figure 15C:
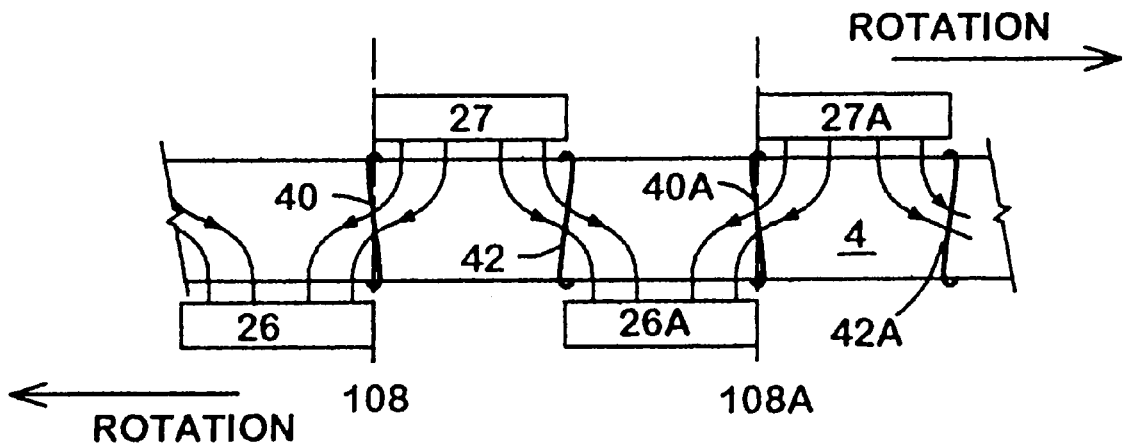

In operation the two rotor disks are made to counter-rotate at essentially equal speeds as indicated in FIG. 14. It will be understood that, due to this counter- rotation, the poles 27, 27A, etc will momentarily align with poles 26, 26A. etc, at rotor-pole-alignment-positions 108, 108A, etc, and again at point 110, 110A, etc., midway along the circumference of the armature between these points. FIGS. 15A, 15B and 15C show the variation of flux in one pair of complementary armature coils 40 and 42 as the rotors counter-rotate through three positions with the field energized. It will be noted that the counter-rotating magnetic fields of the rotor bars will create a standing wave pattern of flux distribution within outer stator ring 4. Due to this variation in flux, and due to the alignment of the complementary armature windings, output voltage is generated in the armature windings.

As described for previous embodiments, the load currents flowing in the complementary armature coils induce equal but opposite circumferential flux in the outer armature ring and these fluxes superimpose to cancel inductive effects. For minimal inductance from load induced flux passing through the rotor structure, there should be an even number of poles on each rotor structure; (this leads to the same analysis and results as explained with respect to FIG. 6 for the "even number of pole pairs" of previous embodiments.) These arrangements help create a low inductance generating device.

Figure 16:
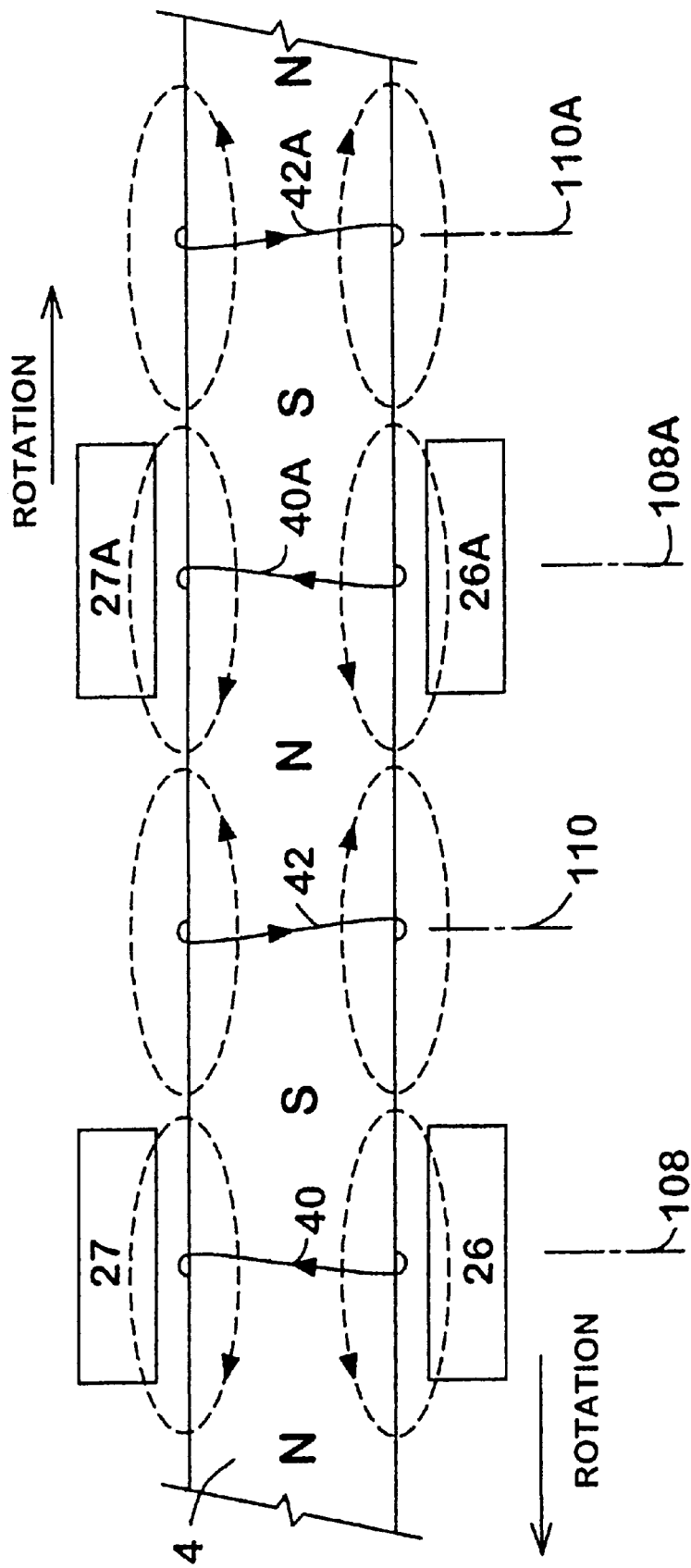
FIG. 16 shows flux distributions, induced by armature winding currents, in a developed view along the circumference of the outer stator ring for motoring operations of the alternate embodiment with counter-rotating rotors.

This embodiment can also be used in motoring operation by pulsing current in the armature coils at the correct times. FIG. 16 shows one instant during which the complementary armature coils 40 and 42 may be energized to produce local magnetic poles along the circumference of the outer stator ring 4 in a manner that will attract the field excited magnetic rotor poles 26 and 27, etc. toward the desired new position in their counter-rotation. This motoring operation will increase the speed of the rotor and store additional energy in flywheel momentum. There are other combinations of position and armature energization that will assist in this motoring cycle. Due to the complementary winding of the armature poles, the inductance will be limited to the flux creating the local magnetic poles while the circumferential flux in the armature ring will superimpose and cancel; this will produce a low inductance device.

In both motor and generator modes, the counter-rotating rotors act to cancel each other's external gyroscopic effects. Also, if energy storage and retrieval is done evenly between the two counter-rotating rotors, then reaction torque on each rotor will be equal and opposite and there will be essentially no net reaction torque on the stator during motoring or generation operation. This can be useful for space satellite operation where unbalanced reaction torque can cause undesirable rotation of the satellite.

Figure 17:
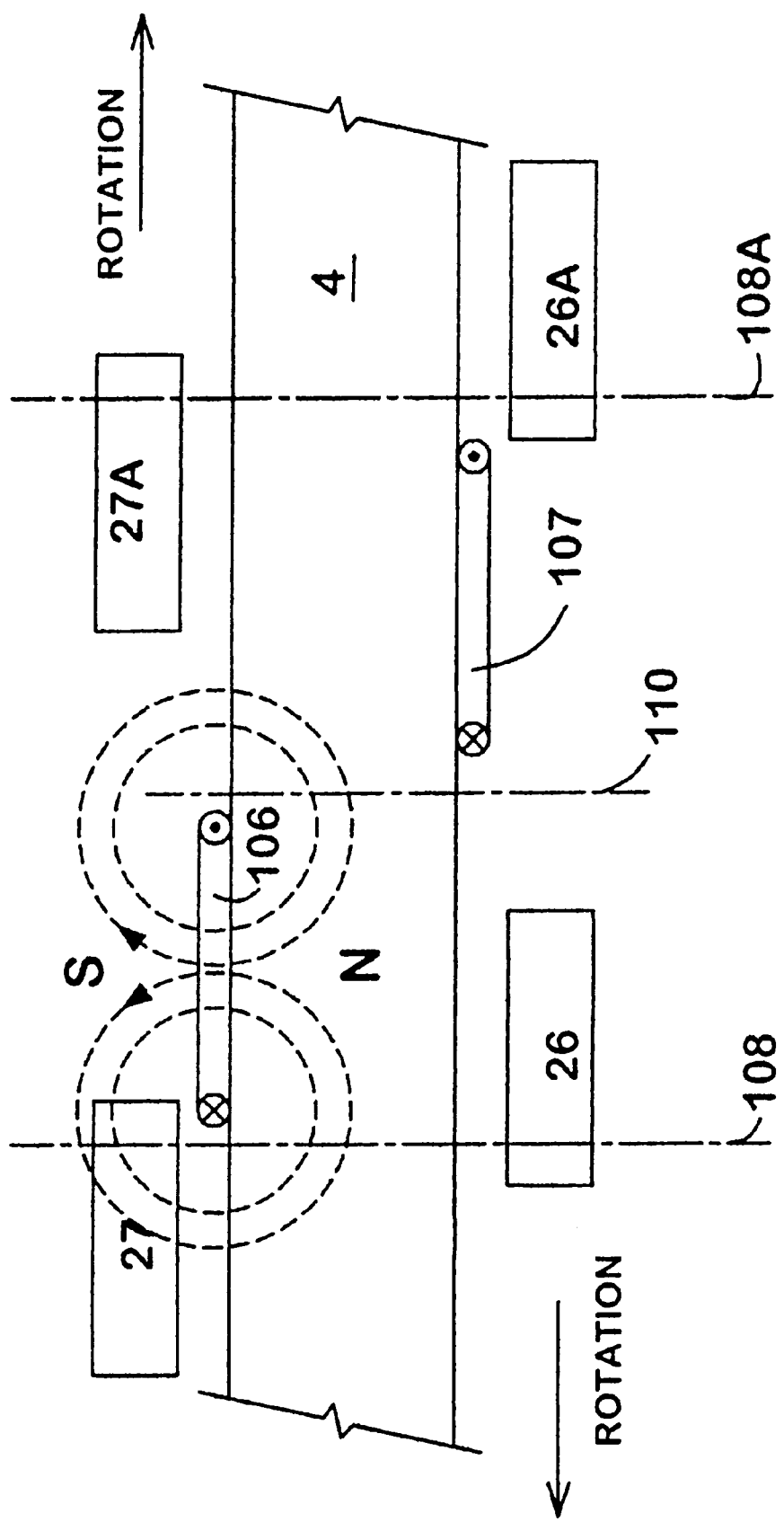
FIG. 17 shows the magnetic field along the developed view of the outer stator ring for a phase trim coil for use with counter-rotation rotors.

For this embodiment using counter-rotation it is necessary that the phase angle of the rotors be controlled so that the pole alignment position 108, 108A, etc., remains constant relative to the position of the complementary armature coils 40 and 42. It is also required that this phase angle control be independent of rotor speed so that the flywheel speed may vary as energy is stored and removed from the system. An external control system using phase lock loop techniques can be employed to keep the relative phase angles the same over a broad range of speeds. To enable this control there are two major requirements; the control system must be able to measure the rotational angle of the shaft, and there must be means for differentially controlling the phase angle of the rotors. There are various well known means, such as shaft encoders, for sensing the shaft angle. FIG. 17 shows one means of providing differential control of the phase angle of the rotors. A phase angle trim coil 106 or 107 can be energized to produce a local pole on only one side of the armature ring. Several such trim coils may be placed at strategic locations along the circumference of the outer ring 4 of the stator. Phase trim coils 106 and 107 may be energized independently of one another and independently of the armature coils 40 and 42. An external control system energizes the phase trim coils at appropriate moments to attract or repel the rotor poles 26 or 27.

It is generally best to have an external phase lock loop control system operate the phase trim coils 106,107 in a manner to speed up which ever rotor, 24 or 25, which is lagging in phase angle. Speeding up the lagging rotor adds kinetic energy to the system which may be efficiently recovered at a later time. Differential control of the phase angle of the rotors is thus achieved. This phase trim control can operate in motoring mode regardless of whether the armature windings 40, 42, are being operated in motoring, idling or generator mode.

For space satellite operations it may occasionally be desirable to use the inertia of the energy storage flywheel as a base for adjusting the attitude of the satellite. Special operation of the phase trim coils 106 and 107 by an external control system could allow for the net torque levels on the two rotors, 24 and 25, to be different. Such net torque could be used to help the satellite adjust its attitude. It is important that, at the completion of the maneuvering, the rotor be returned to speed and phase synchronization.

To store large amounts of flywheel energy in a small device requires a device that runs at very high speed and therefore has high operating frequency. The low inductance features will be essential for efficient switching at flywheel frequencies. Since core losses are very sensitive to frequencies (core losses generally vary as frequency squared), the low-core-loss features of this invention will be important for efficient operation at flywheel frequencies.

It will be noted that the four air gap magnetic pathway shown in FIG. 13 is useful for counter-rotation of the rotors. FIG. 18 shows the cross section for an alternate embodiment with a three air gap magnetic pathway. In this embodiment inner rotor core elements 112 and 114, made of low loss magnetic material, such as ferrite, are attached by mechanical means to shafts 22 and 22A, respectively. The two inner rotor core elements 112 and 114 are separated by an axial air gap 116. It is also necessary for the inner rotor core elements to have radial clearance to rotate clear of field coil element 8. This configuration allows for the possibility of counter rotation of the rotors structures and provides some, but not all, of the benefits of the four air gap configuration. In addition, a magnetic pathway with three air gaps can provide less reluctance than a magnetic pathway with four such air gaps so the requirements for excitation current and field energy will be reduced.

Although the invention has been described with respect to various embodiments, it should be realized that this invention is also capable of a wide variety of further and other embodiments within the spirit and scope of the appended claims.

What is claimed is:

1. A low inductance electric machine including:
   a. a stator structure including an armature structure made substantially of low loss material;
   b. a single phase of armature windings coupled to said armature structure, wherein said phase of armature windings includes one or more complementary pairs of armature windings arranged so that magnetic flux, within said armature structure, induced by currents in said complementary pairs of armature windings effectively cancels;
   c. a pair of rotor structures arranged to counter-rotate and store kinetic energy as flywheel momentum while providing mutually opposing external gyroscopic effects, each of said rotor structures having a plurality of rotor poles associated with said stator and separated from said armature structure by two air gaps, wherein said pair of rotor structures is configured to create magnetic poles which interact with said windings, or with magnetic flux of said windings, to provide electromechanical energy conversion;
   d. means to magnetize or excite magnetic flux within said rotor poles; and
   e. a plurality of phase trim windings arranged to provide differential magnetic fields on each side of said armature structure, and wherein each of said phase trim windings may be excited to maintain phase synchronization of said rotors, and in particular to maintain rotor-polealignment-position with respect to the circumference of said armature, independent of speed of said pair of rotor structures.

2. The machine as claimed in claim 1 wherein said armature structure is an annular ring, wherein each of said rotor structures includes, an even number of said rotor poles, and wherein each of said rotor structures is of opposite polarity, controllable by excitation means.

3. The machine as claimed in claim 2 wherein there is one pair of said armature windings for every two of said rotor poles and wherein said pairs of armature windings are complementary poloidally-wound pairs, spaced one half of one counter-rotating- rotor-pole-spacing apart.

4. The machine as claimed in claim 3 wherein the machine is an alternator and wherein when said rotor structures are energized and, are counter-rotating in phase synchronization, with respect to the position of said armature windings along the circumference of said armature structure, in order to create a standing wave pattern of flux within said armature structure and said armature windings, they generate a desired output voltage controllable by an excitation means.

5. The machine as claimed in claim 3 wherein the machine is a motor and wherein when said rotor structures are energized to create magnetic poles and said armature windings are periodically energized to attract or repel said rotor poles toward specific positions along the circumference of said armature structure, they effect acceleration of said rotor structures.

6. The machine as claimed in claim 3 wherein said phase trim windings may be further operated in a manner to temporarily impart differential amounts of kinetic energy to each of said rotor structures in order to produce external reaction forces useful in the adjustment of the spatial orientation of a space vehicle.

7. A low inductance electric machine including:
   a. a stator structure including an inner annular ring and an outer annular ring concentric therewith, said outer annular ring acting as the armature in conjunction with a single phase of armature windings, wherein said single phase of armature windings includes one or more complementary pairs of poloidally wound armature windings arranged so that magnetic flux in said armature induced by currents in said complementary pairs of armature windings effectively cancel;
   b. two counter-rotating rotor structures associated with said stator structure, wherein each of said rotor structures includes means for holding an even number of evenly spaced radial rotor pole bars, wherein said radial rotor pole bars are separated by two air gaps from opposing axial faces of said stator structure, and wherein each rotor pole bar provides a magnetic pathway between said inner annular ring and said outer annular ring via said air gaps;
   c. a magnetic pathway established axially and circumferentially through said outer ring via a first pair of axial air gaps established between said outer annular ring and said rotor structures, and radially through said rotor pole bars, and axially and circumferentially through said inner annular ring via a second pair of axial air gaps established between said inner annular ring and said rotor structures;
   d. means for magnetizing said magnetic pathway, said means arranged so that the radial magnetization of each of said sets of rotor pole bars is of opposite polarity, and wherein there is one pair of said complementary armature windings for every two of said rotor pole bars, with individual ones of said complementary pairs of armature windings spaced along the circumference of said outer armature ring by one half of one counter-rotating-rotor-pole spacing; and
   e. a plurality of phase trim windings arranged to provide differential magnetic fields on each side of said armature structure, and wherein each of said phase trim windings may be excited to maintain phase synchronization of the rotors, and in particular to maintain the rotor-pole-alignment-position with respect to the circumference of said armature, independent of speed of said rotor.

8. The machine as claimed in claim 7 wherein said means for magnetizing said magnetic pathway includes an annular toroidal field coil of insulated turns of copper, placed coaxial and between said inner annular ring and said outer annular ring to provide excitation means for a current to energize and control a magnetic field in said rotor structure.

9. The machine as claimed in claim 8 wherein the machine is an alternator and wherein when said rotor structures are energized and are counter-rotating in phase synchronization, with respect to the position of said armature windings along the circumference of said armature structure, in order to create a standing wave pattern of flux within said armature structure and said armature windings, they generate a desired output voltage.

10. The machine as claimed in claim 8 wherein said phase trim windings may be further operated in a manner to temporarily impart differential amounts of kinetic energy to each of said rotor structures in order to produce external reaction forces useful in the adjustment of the spatial orientation of a space vehicle.

11. The machine as claimed in claim 7 wherein said means for magnetizing said magnetic pathway includes forming said inner annular ring of a permanent magnetic material magnetized axially, and wherein said rotor pole bars are made substantially of low-loss material.

12. The machine as claimed in claim 7 wherein said means for magnetizing said magnetic pathway includes forming said rotor pole bars of a permanent magnetic material magnetized radially, and wherein said inner annular ring is formed of a low-loss material.

13. The machine as claimed in claim 7 wherein said outer annular ring is formed of a low-loss material that is a laminated steel having laminate surfaces lying approximately coaxial with an axis of said shaft.

14. The machine as claimed in claim 7 wherein the machine is an alternator and wherein when said rotor structures are energized and are counter-rotating in phase synchronization, with respect to the position of said armature windings along the circumference of said armature structure, in order to create a standing wave pattern of flux within said armature structure and said armature windings, they generate a desired output voltage, controllable by an excitation means.

15. The machine as claimed in claim 7 wherein the machine is a motor and wherein when said rotor structures are energized to create magnetic poles and said armature windings are periodically energized to attract or repel said rotor poles toward specific positions along the circumference of said armature structure, they effect acceleration of said rotor structures.

16. A low inductance electric machine including:
a. a stator structure including an outer annular ring, said outer annular ring acting as the armature in conjunction with one or more phases of armature windings, wherein each of said phases of said armature windings includes one or more complementary pairs of poloidally wound armature windings arranged so that magnetic flux in said armature induced by currents in said complementary pairs of armature windings effectively cancel;
b. two rotor structures associated with said stator structure, wherein each of said rotor structures includes means for holding an even number of evenly spaced radial rotor pole bars, and means for holding an inner rotor core formed as an annular ring, and wherein outer ends of said radial rotor pole bars are separated by axial air gaps from opposing axial faces of said outer annular ring, and wherein each rotor pole bar provides a magnetic pathway from said outer annular ring, via said air gaps, to said inner rotor core;
c. a magnetic pathway established axially and circumferentially through said outer ring via a first pair of axial air gaps established between said outer annular ring and said rotor structures, and radially through said rotor pole bars, and axially and circumferentially through said inner rotor cores, and completed via an inner axial air gap established between said inner rotor cores; and
d. excitation means for magnetizing said magnetic pathway, said means arranged so that the radial magnetization of each of said sets of rotor pole bars is of opposite polarity, and wherein there is one pair of said complementary armature windings for every two of said rotor pole bars.

17. The machine as in claim 16 wherein:
a. said rotor structures are counter rotating;
b. wherein individual ones of said complementary pairs of armature windings are spaced along the circumference of said outer armature ring by one half of one counter-rotating-rotor-pole spacing; and
c. wherein said machine includes a plurality of phase trim windings arranged to provide differential magnetic fields on each side of said armature structure, and wherein each of said phase trim windings may be excited to maintain phase synchronization of the rotors, and in particular to maintain the rotor-pole-alignment-position with respect to the circumference of said armature, independent of speed of said rotor.

18. The machine as claimed in claim 17 wherein the machine is a motor and wherein said rotor structures are energized to create magnetic poles and wherein said armature windings are periodically energized to attract or repel said rotor poles toward specific positions along the circumference of said armature structure so as to effect acceleration of said rotor structures.

19. The machine as claimed in claim 17 wherein the machine is an alternator and wherein when said rotor structures are energized and are counter-rotating in phase synchronization, with respect to the position of said armature windings along the circumference of said armature structure, in order to create a standing wave pattern of flux within said armature structure and said armature windings, they generate a desired output voltage, controllable by excitation means.

20. The machine as claimed in claim 16 wherein:
a. said rotor structures are affixable to a common shaft which provides means to couple said rotor structures to an external load or source of rotary power, and wherein each of said rotor structures is shifted circumferentially with respect to one another by one pole spacing; and
b. wherein individual ones of said complementary pairs of armature windings are spaced along the circumference of said outer armature ring by one pole spacing.

21. The machine as claimed in claim 20 wherein the machine is a motor and wherein when said rotor structures are energized to create magnetic poles and said armature windings are periodically energized to attract or repel said rotor poles toward specific positions along the circumference of said armature structure, they effect movement of said rotor structures.

22. The machine as claimed in claim 20 wherein the machine is an alternator and wherein when said rotor structures are energized and rotated to create a moving pattern of flux within said armature structure and said armature windings they generate a desired output voltage controllable by excitation means.

23. The machine as claimed in claim 16 wherein said means for magnetizing said magnetic pathway includes an annular toroidal field coil of insulated turns of copper, placed coaxially inside said outer annular ring to provide excitation means for a current to energize and control a magnetic field in said rotor structure.

* * * * *